United States Patent [19]
Smart

[11] Patent Number: 5,241,621
[45] Date of Patent: Aug. 31, 1993

[54] MANAGEMENT ISSUE RECOGNITION AND RESOLUTION KNOWLEDGE PROCESSOR

[75] Inventor: Ronald G. Smart, Francestown, N.H.

[73] Assignee: Digital Equipment Corporation, Maynard, Mass.

[21] Appl. No.: 721,042

[22] Filed: Jun. 26, 1991

[51] Int. Cl.⁵ .............................................. G06F 15/18
[52] U.S. Cl. .......................................... 395/51; 395/76
[58] Field of Search ..................... 395/76, 12, 51, 61

[56] References Cited

U.S. PATENT DOCUMENTS

4,688,195  8/1987  Thompson et al. .................. 364/300

OTHER PUBLICATIONS

Begeman et al., "The Right Tool for the Job", Byte, Oct. 1988, 255-266.
Gathmann et al., "Towards a Manageable Solution to the Iterative Development of Embedded Knowledge--Based Systems", IEEE Conf. on Managing Expert System Programs and Projects, Sep. 1990, 41-50.
Carberry, S., "Incorporating Default Inferences into Plan Recognition" Proceedings Eighth National Conf. on Artificial Intelligence, Jul. 1990, 471-478.
Lemke et al., "A Cooperative Problem Solving System for User Interface Design", Proceedings Eighth National Conf. on Artificial Intelligence, Jul. 1990, 479-484.

*Primary Examiner*—Michael R. Fleming
*Assistant Examiner*—Robert W. Downs
*Attorney, Agent, or Firm*—A. Sidney Johnston; Barry N. Young

[57] ABSTRACT

A knowledge processing system and a method for operating same for interacting with a user of the system. The system includes a user interface for prompting the user to enter information and for receiving entered information from the user. The user interface is coupled during use to a knowledge model processor (10) that includes a Dialogue Control Interpreter (16) that provides structured messages to a user so as to elicit responses from the user concerning Imperatives of the user, Situations of the user, Knowledge known to the user, and Executive Agents known to the user. This information is stored in a User Awarenesses database (18). The Dialogue Control Interpreter operates in accordance with predetermined dialoguing Imperatives (20) to elicit, record, and access user responses in sequences that guide and motivate the user to follow predetermined sequences of thought, based on the recorded User Awarenesses database of Imperatives, Situations, Knowledge, and Executive Agents. The system further includes dialoguing knowledge templates (22) which are designed to enable the user to make an appropriate response to inquiries by the system so as to motivate and guide the user along predetermined sequences of thought.

26 Claims, 6 Drawing Sheets

MANAGEMENT ISSUE RECOGNITION AND RESOLUTION KNOWLEDGE PROCESSOR

FIELD OF THE INVENTION

This invention relates generally to a class of data processors referred to as Knowledge Processors and, in particular, to a method of managing a dialogue between a knowledge worker, or user, and a novel knowledge processor based upon a Management Issue Recognition and Resolution (MIRR) knowledge model. The knowledge processor based on the MIRR knowledge model, during a dialogue with the user, detects and identifies a particular set of user mental states or objects and uses them to guide the user's mental processes along selected pathways that are known to facilitate efficient knowledge development, exchange, and application.

BACKGROUND OF THE INVENTION

Many data processors can be considered to employ Knowledge Processing (KP) software, where Knowledge Processing is defined to be a systematic development, exchange and application of knowledge by humans. Under this general definition, Knowledge Processors form a general class of programmed systems, also referred to herein as workstations, that facilitate human knowledge development, exchange, and application by dialoguing with the user in an interactive exchange.

Research, learning/teaching, problem-solving and deliberation are all mental activities in which knowledge workers engage, often with interactive support from computer software. However, the interactive support process has generally been ineffectively structured and not optimized for the user's intended purpose. For example, deliberation by Electronic Mail, or by Conferencing Software, is generally less efficient than desired, due in part, to an ineffectively structured nature of the interaction and a difficulty in maintaining a user's mental discipline during the interaction session.

It is the general object of the invention to overcome these problems of the prior art by pre-structuring an interactive dialogue process and by introducing, where appropriate, relevant expert knowledge segments into the dialogue. Thus, one specific object of the invention is to provide an interactive, structured dialoguing method that enables a knowledge worker to engage in systematic deliberation, learning, and goal-directed problem-solving.

It is another specific object of the invention to provide a knowledge model and a method for interacting with same, that enables a knowledge worker, such as a business manager, to operate in an efficient and effective manner in regard to planning and managing activities.

SUMMARY OF THE INVENTION

The foregoing and other problems are overcome, and the objects of the invention realized, by a knowledge model, and a method of interacting with same, that is based on a particular generic model of the mental structures, and related processes, that systematize a user's work context for goal-directed mental activities.

In accordance with a method to be carried out by a computer system for accomplishing a dialogue with a user of the system, there are disclosed the following steps. A first step provides a first message to the user, the first message being structured so as to elicit a response from the user concerning a name or description of an Imperative of the user. A second step receives a response from the user; and a third step interactively investigates the response to determine component elements of an Imperative of the user. The component elements of the Imperative include (a) a type of triggering State; (b) a type of triggered Action strategy; (c) a set of Probable kinds of consequential States resulting from activating the Action strategy; and (d) a Value rating of this Imperative relative to the user's other Imperatives. The elicited descriptions of Imperatives are ordered by Value and stored as User Imperatives within a data base of stored User Awarenesses.

An Imperative is programming that operates subliminally, but may become conscious as a Psychological force (wish, desire, commitment,..) when triggered to do so by some characteristic kind of situational state. In work situations, Imperatives are established, based on existing more fundamental Imperatives when ever role/goal agreements are made. Imperatives are activated when triggered by characteristic situations. As an example, if a person agrees to make 10% profit at a 20% growth rate and the performance drops below this, the person experiences a Psychological force to act.

The method further includes the steps of providing a second message to the user, the second message being structured so as to elicit a response from the user concerning a name or description of a significant Situation of the user; receiving a response from the user; and then interactively investigating the response so as to determine the component elements of this significant Situation of the user. The component elements of a Situation include (a) the user's name for representing or referring to this Situation, (b) the space-time locality of the Situation, (c) the level of importance (Value) of this Situation, and (d) the Probability that a Situation of this kind and importance actually did, does, or will exist at this space-time locality. The elicited Situation descriptions are ordered by felt importance (Value) and stored in a User Situations area within data base of stored User Awarenesses.

A Situation is considered to be a state of the world in which either the user, or persons and things of concern to the user, are involved. The locality of the referenced Situation may be anywhere in space-time, even though the experience of its importance occurs in a person's conscious awareness. Psychological experiences, for example experiences of emotional distress, have the locality of their triggering state in the person's mind. However the person is likely to project the condition onto some outside situation and imagine this to be the cause of their feelings of emotional distress. The MIRR knowledge model and associated structure of mental objects provides a framework that permits process experts to develop applications to enable users see through these projection activities.

The method further includes a step of providing a third message to the user, during a process of exploring the user Imperatives and Situations, the third message being structured so as to elicit a response from the user concerning User Knowledge; receiving a response from the user; and then interactively investigating the response from the user so as to determine the kind of Knowledge of the user, and the component elements of each kind of Knowledge. Component elements of each kind of Knowledge are stored in respective designated sub-areas of the User Awarenesses data base. This Knowledge area contains (a) Evaluation Knowledge entries, and the method includes instructions for using the Evaluation Knowledge entries to attach priorities to user Imperatives based upon a Value that the user assigns using this Knowledge. The User Knowledge area also contains (b) Object Knowledge entries, and the method includes the step of using the Object Knowledge entries in conducting a dialogue with the user to interactively investigate user responses so as to associate the name of each important Situation with the triggering State(s) of the Imperative(s) that make the Situations important to the user. The User Knowledge area also contains (c) Skills Knowledge entries, and the method further includes a step of conducting a dialogue with the user, using the Skills Knowledge entries, so as to structure one or more Action strategies and plans to satisfy triggered Imperatives. The User Knowledge area further includes (d) Probability (mechanism) Knowledge entries, and the method includes the step of conducting a dialogue with the user that includes a step of using the Probability Knowledge entries, to determine contingent conditions that affect the Probabilities associated with different possible outcomes of the one or more Action strategies being considered. The method may use Knowledge that remains implicit and only accessible to the MIRR model knowledge processor by dialoguing with the user, or it may use explicit Knowledge that was previously recorded in User Knowledge areas by earlier dialoguing with this or other users.

Knowledge refers to structural relationships that are assumed to apply among mental objects such that these objects and their relationships can be seen as a composite mental model of some situation. Knowledge is used to relate actual situations in the world to one's mental models of like situations or states. Knowledge allows one to project or imagine backwards and forwards in time and through space, without having to be physically present to actually observe a situation. Using Knowledge, one can estimate existence probabilities for situations that might exist elsewhere in space-time.

The method further includes a step of providing a fourth message to the user, during a process of exploring Action strategies, the fourth message being structured so as to elicit a response from the user concerning Executive Agents that might be available for use by the user, receiving a response from the user; and then interactively investigating the response from the user so as to determine and record, in the User Awarenesses data base, the names and capabilities of these Executive Agents. The elements of these records are; (a) a reference description or name for this Executive Agent, (b) a triggering Signal that will invoke the Agent to act as required, (c) an Activity that the Agent will then execute in response to this request or Signal, and (d) a Message that the Agent is expected to volunteer when this Activity is completed.

An Executive Agent may, by example, be a programmed computer system, a person who habitually executes a known activity given a known stimulation, or a group of people or an organization for whom activity is somewhat predictable when they receive certain stimulating signals. For some kinds of Executive Agents, whose Activities in response to the stimulating signal are uncertain, the record includes the probabilities. This portions of the User Awarenesses data base thus records what users know about Executive Agents that users can call on to behave in understandable ways.

The invention also teaches a knowledge processing system for interacting with the user of the system. The system includes a User Interface for prompting the user to enter information and also for receiving entered information from the user. The general templates for these prompts are recorded in a Dialoguing Knowledge area of the system. These prompts are presented to the user in a sequence that is recorded as programming in a Dialoguing Imperatives area of the system. These sequences are referred to as Dialoguing Imperatives because they become sequences that a user has chosen and they thus serve as user Imperatives for an interactive dialogue session. This dialogue controlling programming contains instructions that combine particular data from the system's User Awarenesses area, with general templates from the Dialoguing Knowledge area, to form the actual prompt that is presented to the user. The Dialoguing Knowledge templates specify where in the User Awarenesses data base a user's current response is to be recorded. The dialoguing sequence thereby builds on Awarenesses of user responses to date, to then guide and motivate the user's next mental processing steps. The Dialoguing Imperative sequences and associated Dialoguing Knowledge templates are developed by dialogue experts. A menu of the pre-programmed Dialogue Imperatives is offered to the user when the user first engages the knowledge processing system. Once the user selects the dialoguing sequence she/he desires to go through, this becomes the active Dialoguing Imperative. The system takes control and guides the user through this dialogue to the end, provided the user wants to continue. The system employs the user as a willing "co-processing unit" to enable the system to build up a record of this user's stream of mental Awarenesses.

The system's User Awarenesses data base records the particular data supplied by the user as the dialogue proceeds. This data includes user responses to interrogative messages about the user's own Imperatives and important Situations. This knowledge processor based on the MIRR knowledge model exploits relationships among the mental objects or states of the users. These relationships include the fact that Situations are made important by Imperatives, and that Knowledge relates one mental object or state to another and/or to a particular Situation in the user's Physical world.

The dialoguing sequence implements a method that clarifies for the user what makes the user's relationship to certain Situations important to resolve. The method then guides the user through a thinking sequence that exploits the MIRR knowledge model so as to look for and choose resolution strategies and plans. The method includes requests to the user to set expectations (expectations of future Situations) for probable outcomes from attempting this resolution plan. These expectations are based on the knowledge available to the user at the time. The method further guides the user through these resolution plans, including plans to invoke the sequences of wanted actions by the various available Executive Agents.

Subsequently, when the user acknowledges to the system that the plan should have been carried out, the method then guides the user through a checking procedure for comparing actual results with the above knowledge-based expectations. The results from this comparison give experiential learning data that either confirms or updates the user's Knowledge model. The learning takes place in the user's own mental Knowledge structures. However, the method encourages users to record explicit references to these Knowledge structure changes in the system's record of User Knowledge within the data base of User Awarenesses. The explicit Knowledge is then available for later reference by this or another user. The method includes further steps for resolving Knowledge access, agreement renegotiation, and other emotionally important Situations that may arise during deliberations, learning, research, etc.

The MIRR Knowledge model teaches a systematic method, operating under dialogue control, for discovering, exchanging and applying knowledge for effective recognition and resolution of important situational issues that arise in business and other planning, management, learning or research situations. The user interacts with the system in a dialoguing prompt and response mode, via the User Interface, such as a keyboard and display apparatus. The user interface is coupled during use to a knowledge model processor that includes apparatus for storing data and for retrieving the stored data. The knowledge model processor further includes a Dialoguing Control Interpreter that executes user selected Dialoguing Imperative sequences of instructions. This Interpreter accesses the indicated Dialoguing Knowledge templates, adds the indicated entries from the User Awarenesses areas, and sends the combined message or picture to the User Interface for presentation to the user. It then receives the user's response and records it in an indicated location of the User Awarenesses data base. All of these indications are specified in the instructions that are generated in sequence from selected Dialoguing Imperatives and Dialoguing Knowledge templates.

Three storage areas are accessed by the Dialoguing Control Interpreter as it executes the instructions from the Dialogue Imperative sequence. One such storage area is a User Awarenesses storage area that is partitioned into a User Imperative area, User Situations area, User Knowledge area and user Executive Agents area. Another storage area is referred to as a Dialoguing Knowledge area. This contains general templates that are the generic prompts to the users. These records are addressed by the associated instructions in the Dialoguing Imperatives area. Finally, there is a Dialoguing Imperative storage area that provides dialogue control instructions for use by the Dialoguing Control Interpreter. All pre-programmed Dialoguing Imperatives are recorded in this third storage area, and the sequence that is selected by the user, from a total menu of Dialoguing Imperatives, is given program control of the system.

The invention thus provides experts with a knowledge processing platform and a MIRR framework with which to craft knowledge processing dialogues for less expert users. The MIRR framework provides experts and users with standardized ways to think about an expert's particular knowledge domain. The platform, which may be comprised of a single data processor, a multiprocessor, or a plurality of networked Knowledge Processor workstations, accumulates and communicates knowledge in an expert's domain, as well as awarenesses of how the knowledge has been applied in particular situations of special interest to classes of users. In this manner, the invention facilitates an acceleration of the human processes involved in knowledge development, exchange, and application to many different professional/academic domains.

BRIEF DESCRIPTIONS OF THE DRAWING

The foregoing and other aspects of the invention are fully described in the following detailed descriptions of the invention which is intended to be read in conjunction with the attached drawings, wherein.

DETAILED DESCRIPTION OF THE INVENTION

Appended to the specification are four Appendices that further describe the invention. Specifically, Appendix A describes in greater detail a structure of a User Awarenesses data base, shown in FIG. 1, that is structured in accordance with the MIRR knowledge model of the invention and an associated model of mental objects.

Appendix B describes a symbolic addressing algebra for the structure shown in Appendix A for use by dialogue experts in designing Dialoguing Imperatives and their associated Dialoguing Knowledge templates using the MIRR model. As used herein, a dialogue expert is considered to be one having knowledge of the symbolic addressing algebra.

Appendix C describes a high level instruction format used in specifying Dialoguing Imperatives that experts supply, and illustrates the associated Dialoguing Knowledge templates that primarily instruct a Dialoguing Control Interpreter in the assembly of messages to the user and in the recording of the user responses.

Appendix D describes relationships that are defined to exist among the different types of Knowledge defined by the MIRR knowledge model and also between these types of Knowledge and the other associated mental objects.

THE OVERALL KNOWLEDGE PROCESSOR

Figure 1:
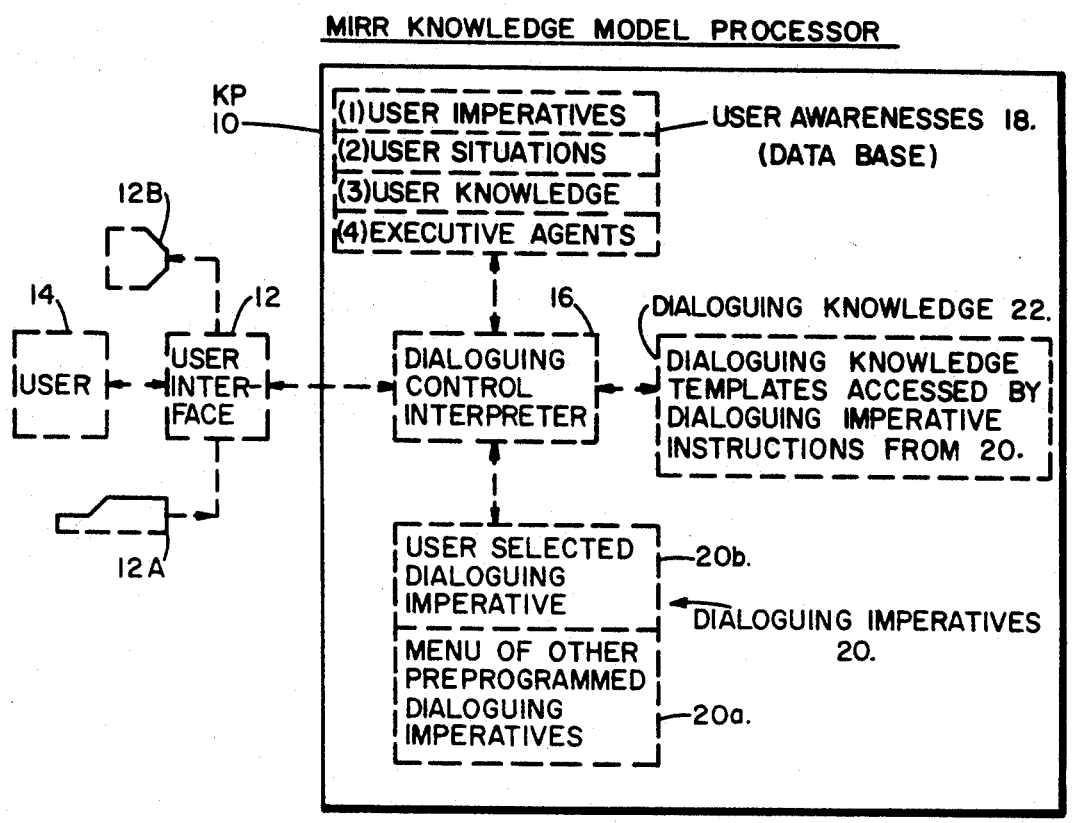
FIG. 1 is a block diagram of a knowledge processor constructed and operated according to the invention.

Referring to FIG. 1 there is shown in block diagram form a workstation, or knowledge processor (KP) 10, constructed and operated in accordance with the invention. During use, the KP 10 interacts through a physical user interface 12 with a knowledge worker, also referred to herein as a user 14. The physical user interface 12 includes, by example only, a keyboard 12a and a display 12b. The construction and operation of the user interface 12 is considered to be well known in the art and will not be further described in any significant detail herein, except to state that it may include a full range of biological sense and response interfaces with the user.

The KP 10 includes a plurality of interconnected logical elements and may be embodied in a single data processing device or within a plurality of interconnected data processing devices, each including a memory. These logical elements include a block 16 containing the Dialoguing Control Interpreter of KP 10. The Dialoguing Control Interpreter 16 communicates bidirectionally with the user 14 through the User Interface 12. Coupled bidirectionally to the Dialoguing Control Interpreter 16 is a block 18 containing data structures representing user 14 Awarenesses. These User Awarenesses 18 are embodied in a plurality of record entries representing detected mental representations of objects, states and concepts elicited from the user 14 during a structured dialoguing session controlled by the Dialoguing Control Interpreter 16. Also coupled to the Dialoguing Control Interpreter block 16 is a block 20 wherein are stored structures representing a repertoire or set of ordered procedures or Dialoguing Imperatives. The Dialoguing Imperatives block 20 are also embodied in a plurality of record entries representing pre-programmed KP 10 Dialoguing Imperatives 20a and also the Dialoguing Imperative sequence 20b that is selected by the user 14 during the initialization of the dialoguing session controlled by the Dialoguing Control Interpreter 16 of the KP 10. A further block 22 is also coupled to the Dialoguing Control Interpreter block 16 and stores a Dialoguing Knowledge data base used for informing, motivating, guiding and interrogating the mental actions of user 14. A detailed description of each of these logical elements that comprise the KP 10 is set forth below.

THE DIALOGUE CONTROL INTERPRETER 16 & BASIC KP 10 FLOW DIAGRAM

Figure 2:
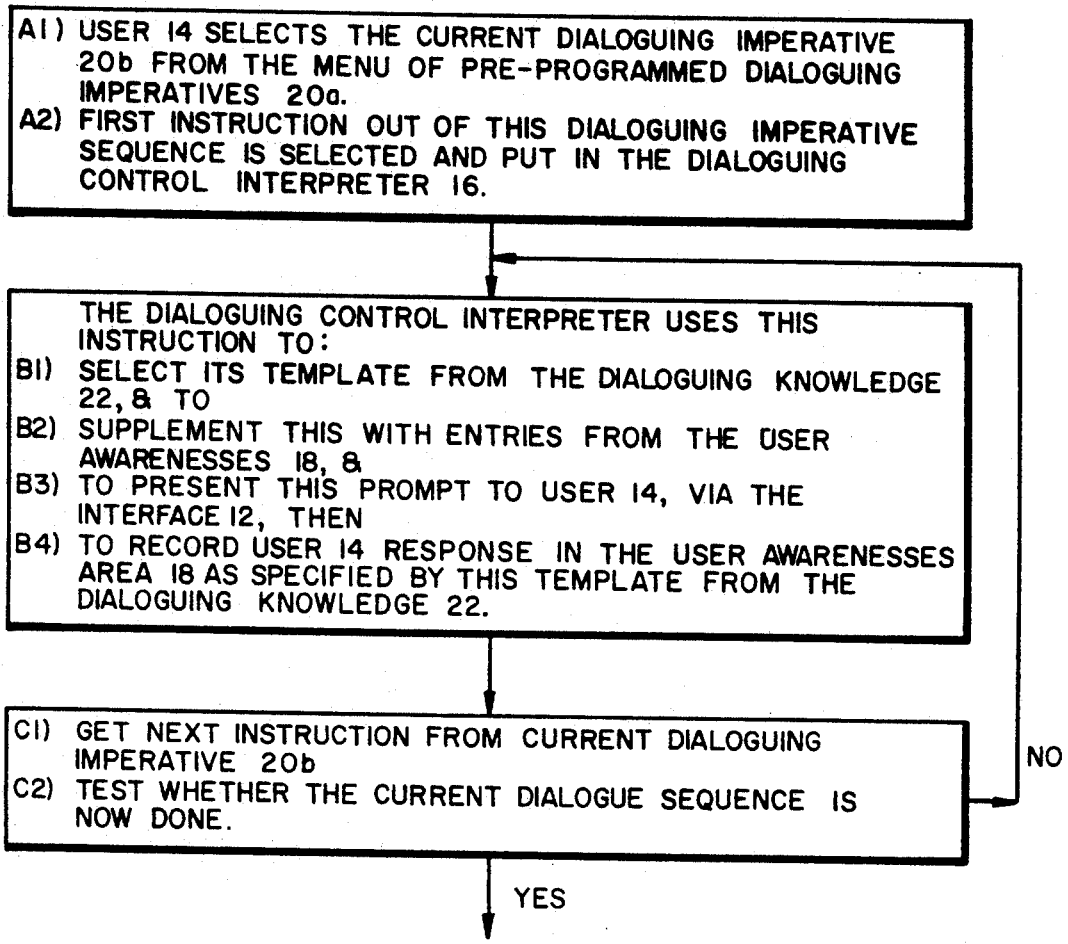
FIG. 2 is a flow chart illustrating a general sequence of operations of the Knowledge Processor of FIG. 1, and in particular the functioning of the Dialoguing Control Interpreter.

First, and in reference to the flow chart of FIG. 2, there is described the general sequence of operation of the KP 10 as it is controlled by the Dialoguing Control Interpreter block 16 of KP 10 in FIG. 1. This flow chart applies to all Dialoguing Sequences controlled by the Dialoguing Control Interpreter of the KP 10, independent of the particular Dialoguing Imperatives and Dialoguing Knowledge templates supplied by experts in any given dialogue sequence.

At step A1 in block A, the KP 10 Dialoguing Imperatives 20b is selected during initialization by user 14. The user 14 initiates a dialoguing session through the User Interface 12 and, in response, KP 10 accesses the Dialoguing Imperatives 20a and presents a menu, or repertoire, of pre-programmed Dialoguing Imperatives 20a to the user 14. The user 14 chooses the Dialoguing Imperative sequence that he/she desires to be guided through. This choice by the user 14 thus transfers this user's Dialoguing Imperative to KP 10 which adopts this Dialoguing Imperative as its own by placing the chosen Dialoguing Imperative into the area 20b. This Dialoguing Imperative resident in block 20b subsequently guides the control of the dialogue sequence by KP 10 as long as the user 14 continues this session.

At step A2 in block A, the Dialoguing Control Interpreter 16 selects the first instruction from the current Dialoguing Imperative stored in 20b. This first instruction then controls the micro-actions of the Dialoguing Control Interpreter 16. Each of the subsequent Instructions is selected, as specified in the sequence of instructions from the Dialoguing Imperative area 20b, at step C1 in block C of the flow chart FIG. 2.

The KP's 10 pre-programmed Imperatives 20a are high level programmed sequences that control and guide the dialogue with the user 14. The Dialoguing Control Interpreter 16 may perform several levels of interpretation before producing instructions that the physical hardware can execute. An instruction format for the recommended high level language is described in Appendix C. The instruction interpreting and micro-coded systems design of the Dialoguing Control Interpreter are considered to be well known in the art and will not be described in particular detail herein.

At step B1 in block B of FIG. 2, the Dialoguing Control Interpreter next uses the current instruction from the Dialoguing Imperative 20b to select the indicated knowledge template from the Dialoguing Knowledge block 22 in FIG. 1. The templates, along with the associated Dialoguing Imperative instructions in block 20, are designed by dialogue experts for entry into a basic general Knowledge Processor KP 10. New Dialoguing Imperatives 20 and Knowledge templates 22 can be added to any particular KP 10 at any time by experts, or any user, so as to develop Knowledge Processors increasingly more complex and capable. Each such addition is identified as to an author (f) location in block 20, then is named for reference and access purposes by this or other users. This information is recorded in the User Awarenesses data base 18 in the section (4) of KP 10, to make the KP 10 "self aware". That is, the MIRR Knowledge model design basis includes the provision for KP 10 to carry its own record of the name and author of its own capabilities, recorded as programmed Executive Agents for users. This is seen in Appendix B where the (f) coordinate is used to identify persons. The (f) and the other coordinates described in Appendix B are for use by the dialogue experts as the dimensions of mental space, as well as components of symbolic addresses for locations in the User Awarenesses data base 18 of KP 10. These coordinates provide the Dialoguing Knowledge template designer with the means for specifying the addresses for record reading and writing in the User Awarenesses data base 18.

At step B2 of block B, the Dialoguing Control Interpreter next uses the selected Dialoguing Knowledge template 22, interpreting the specification (symbolic addresses) of the data to be added from the User Awarenesses data base 18 block in FIG. 1. One method to accomplish this is for the Dialogue Control Interpreter 16 to replace the symbolic address with the content of this address in the User Awarenesses data base 18. Note that these symbolic addresses are of variable length, depending on how many of the coordinates (fghijkwxyz) the dialogue expert select so as to give the user an unambiguous message However, all data recorded in KP 10's User Awarenesses data base 18 are recorded under control of the Dialoguing Imperative instructions 20 and their associated Dialoguing Knowledge templates 22. The symbolic address (name) that locates the recordings in the User Awarenesses data base 18 are subsequently used to retrieve the data recorded at this same named location in the User Awarenesses 18. It is the responsibility of the dialogue expert to program all of the Dialoguing Imperative 20 instructions and to design the associated Dialoguing Knowledge 22 templates with the logical operation of the dialogue in mind. This is similar to the programming of any computer, except that the dialogue expert is programming the future mental activity of the user 14 as he/she is dialoguing with the KP 10. Appendix C describes these templates.

The Dialoguing Knowledge templates 22 may include any number of symbolic addresses. The Dialoguing Control Interpreter 16 cycles through the template to interpret all the symbolic addresses where data from the User Awarenesses 18 data base is to be used. The actual knowledge template that is presented to the user 14 is thus made up using previous User Awarenesses. A composite message or picture is then ready for informing, motivating, interrogating and guiding actions of the user 14.

At step B3 of block B, this composite message or picture is communicated by the Dialoguing Control Interpreter 16 through the User Interface 12 to the user 14. This acts as a prompt to user 14, and requests a response.

At step B4 of block B, the Dialogue Control Interpreter 16 receives the response from the user 14, through the User Interface 12, and records this in the User Awarenesses data base 18 in a location that is indicated (as a symbolic address) in the basic template of the Dialoguing Knowledge 22 template selected by the Dialoguing Control Interpreter 16, based on the current instruction from the Dialoguing Imperative 20b. As was stated above, the dialogue expert specifies these symbolic addresses in the User Awarenesses areas 18, using the symbolic names as described in Appendix B. These are primarily upper case names for the category of mental object, with lower case names for the mental space coordinates. Any one symbolic address used by the dialogue expert can take any form, provided only that this dialogue expert accesses this data element in the User Awarenesses data base 18 consistently. That is, the name or symbolic address used once in a Dialoguing Knowledge template to record a user awareness must be used again consistently in Dialoguing Knowledge templates that are intended for presentation to the user 14 later in the dialogue. The particular algebra described in Appendix B illustrates a self-consistent addressing discipline that provides a structure matching the assumptions behind the MIRR Knowledge model of the invention. It should be realized that the use of the invention is not to be construed to be limited to only the particular algebra shown in Appendix B. That is, other algebras may be employed to represent the logical constructs defined and used by the invention.

Block B is completed by the Dialoguing Control Interpreter 16 with one interrogative message being sent to the user 14 and one response from the user 14 being recorded in the User Awarenesses data base 18 of FIG. 1.

At step C1 in block C, the Dialoguing Control Interpreter 16 selects the next instruction from the current Dialoguing Imperative in 20b. Where the selection of the next instruction is conditional on results recorded to date, the Dialoguing Control Interpreter 16 makes the determination using normal programming principles which are considered well known in the art. However, note that the KP 10 is using the user 14 as its "coprocessor". This means that the state of the dialogue sequence is a function of the user 14 awarenesses as recorded in User Awarenesses data base 18. If the design of the Dialoguing Imperative 20 is such that a user 14 can choose to break out of a strictly defined sequence, the User Awarenesses 18 collected to date from the user 14 indicate whether particular data needed for a next step in the dialogue has yet to be supplied by the user dialogue. This provides the logic of any conditional instructions.

The status of the dialogue is a function of the conscious interaction of user 14 with the KP 10. Since KP 10 is explicitly considered to be an Executive Agent 18 (4) of the user 14, the instructions in the Dialoguing Imperatives 20 and their corresponding Dialoguing Knowledge 22 templates, address the User Awarenesses elements that describe the KP 10 as an Executive Agent 18 (4) of this user 14. Thus, the settings of any control switches in KP 10 that the dialogue expert is aware of existing at a particular point in the dialogue, can be assigned by this expert to the User Situation area 18 (2), where the name of a switch location (symbolic) is recorded in 18 (2a) and its location in the Executive Agent (space) and in the dialogue sequence (time) recorded in 18 (2b). The remaining two elements, 18 (2c) and 18 (2d) are not required in simple cases but are available for extensions of a dialogue to deeper levels of sophistication. Thus, the invention teaches a knowledge processor design in which the dialogue expert may employ considerable levels of sophistication to develop Dialoguing Imperative instructions and associated Dialoguing Knowledge templates that refer to any mental object that can be accommodated in the User Awarenesses record structure. This deals with an enormous range of mental activity of users, including references to physical world objects as well as mental world objects, for example emotional feelings, provided they can be described by users under prompting by KP 10, and provided there are dialogue experts to structure these dialogues and knowledge templates.

At step C2 in block C, the Dialoguing Control Interpreter 16 examines this instruction and any indicated parameters to determine whether this is the last instruction in the chosen branch of the Dialoguing Imperative from 20b. If not, control is transferred back to step B1 to continue the KP 10 dialogue with the user 14 as specified in the current Dialoguing Imperative from 20b that was selected by the user 14 at initialization. If the dialogue sequence is complete as indicated by the last instruction then the user 14 is so notified in a message from the Dialoguing Control Interpreter 16 through the User Interface 12, and the session terminates. The KP 10 is then available for initialization of another dialogue session with this user 14 or another user.

In the above manner, the user 14 is guided to think through a problem to arrive at some result, the result being arrived at as a function of some mental objects whose representations were previously elicited from the user 14. In effect, KP 10 presents a programmed sequence of instructions to the user 14 for execution by user 14. The "bringing to mind" or to awareness of target mental objects or states in user 14, is accomplished in general by the expert design of knowledge templates recorded in the KP 10 Dialoguing Knowledge 22 area, supplemented by data from previous User Awareness 18 records, sequenced by instructions in Dialoguing Imperatives 20b also supplied by dialogue experts and recorded in the KP 10.

The user 14 is generally not conscious of the underlying structure of the mental objects or states that are being processed by the user 14 during the dialogue and is, instead, considering objects and concepts of immediate concern to the user 14. These objects and concepts have user-specific names and identities which the user 14 supplies at block B step B4 of the flow diagram in answer to specific, expertly structured inquiries made by the KP 10 in step B3 of block B in the flow diagram. With continued use of the KP 10, the user 14 is expected to become more familiar with the mental structures of the MIRR model. At this point, the user 14 may generally prefer to work with more cryptic prompts and to provide more cryptic responses, without losing the train of thought. For users who have graduated to this point of self awareness, different levels of dialoguing sequences may be supplied by experts and made available to users as optional menu items in the Dialoguing Imperatives 20 and Dialoguing Knowledge 22 areas of the same basic KP 10.

THE MIRR KNOWLEDGE MODEL WITHIN ITS MODEL OF OTHER MENTAL OBJECTS

Having described in general terms the basic operation of KP 10, a description is now provided of the KP 10 operation in relation to a specific Knowledge model for use as a basis for the design of Dialoguing Imperatives 20 and their associated Dialoguing Knowledge 22 templates.

The specific model of Knowledge considered herein is referred to as the Management Issue Recognition and Resolution (MIRR) knowledge model having particular utility in the realm of business management knowledge. In general, MIRR is a model of Knowledge that is incorporated within a particular set of categories of mental objects or structures that, in response to structured enquiries, are detectable in the "mental space" of managers, knowledge workers, and others. It should be realized, however, that the utility of the teaching of the invention is not to be construed to be limited to only one specific field of knowledge or one class of knowledge workers. That is, MIRR is a general model that represents knowledge of knowledge itself, and of the associated mental objects and states through which this knowledge model is exploited. Using the MIRR knowledge model, mental objects and processes in different professional knowledge domains can be detected and exploited by knowledge workers engaged in activities such as research, learning/teaching, deliberation or planning and problem-solving in general, all within their particular academic or professional domain of interest. Working in each of these domains depends on having appropriately structured Dialoguing Imperative sequences and associated Dialoguing Knowledge templates to guide a user dialogue and to supply, as required, knowledge from experts or others, elicited from them previously and recorded as User Awarenesses in the KP 10 data base 18 used for engaging the current user. The invention of the knowledge processor based on the MIRR model enables the knowledge domain experts to develop effective and efficient Knowledge Processors that accelerate user knowledge development, exchange and application in their particular professional domains.

A description is now provided of the MIRR knowledge model structures. These structures are incorporated in the design of the User Awarenesses data base (block 18 in FIG. 1) of the MIRR Knowledge Processor KP 10, and are summarized in Appendices A and B. Information given in Appendix B is employed by dialogue experts in designing the Dialoguing Imperatives sequences and Dialoguing Knowledge templates.

There are four general categories of mental objects that the user may be taught to recognize when engaged in, for example, deliberation (as seen in Appendix D). After user 14 is taught to recognize these categories of mental objects the user 14 is enabled to systematize his/her activities for increased effectiveness in developing, exchanging and applying knowledge for their respective goal-directed activities. Even if user 14 does not immediately recognize these mental objects, the method of the invention can still be employed during a dialoguing session, to manage user 14 mental activity so as to guide user 14 through his/her desired procedure or Dialoguing Imperative. A specific procedure is chosen when a KP 10 dialogue is initialized.

As further seen in the details associated with the block diagram of FIG. 1 and the User Awarenesses block 18, as elaborated in Appendices A and B, the MIRR model structures are represented as records of user 14 responses to inquiries designed into the Dialoguing Knowledge templates and sequenced according to the Dialoguing Imperatives. In FIG. 1, block 18 illustrates the four kinds of mental objects, references to instances of which are elicited from user 14 during structured dialogues. These user 14 responses are recorded as User Awarenesses. These categories are:

18 (1) User Imperatives,
18 (2) User Situations,
18 (3) User Knowledge, and
18 (4) Executive Agents.

Each of these four categories of mental objects are further subdivided respectively as shown in Appendix A, into four sub-categories. In general there are many entries recorded within each category and sub-category. These entries are further recorded as lists or tables in the User Awarenesses data base 18. Appendix B shows algebraic names for each of these categories and sub-categories where it can be seen that the indices fghijkwxy and z correspond to dimensions of mental space in which, for example, goal-directed deliberations take place that can be followed and recorded step by step as User Awarenesses.

While this tracking of mental activities is detailed, it may be best employed for resolving particularly difficult and protracted goal-directed deliberations that involve several users in different parts of a computer network. Typical users need not be aware of the underlying algebra, which is employed for symbolic addressing in the User Awarenesses data base 18 by dialogue experts who design new Dialoguing Imperatives sequences and their associated Dialoguing Knowledge templates.

As previously stated, experts in the particular Dialoguing Imperatives stored in 20 and in the associated Dialoguing Knowledge templates stored in 22, provide pre-programmed Dialoguing Imperatives and Knowledge so as to guide the user 14 mental activities via the KP 10. These instructions are issued, step by step, to lead the user 14 sequentially through a sequence of mental activities.

Each of the MIRR model structures, such as categories of mental objects and their sub-categories, has an objective definition. That is, each has a definition that is readily understood given an adequate explanation. Appendix B provides summary descriptions, including preferred formal algebraic expressions, which aid in establishing the definitions. The KP 10 provides a structured message to the user 14 and requests a response. Assuming that messages to the user 14 are correctly and expertly crafted, the KP 10 is enabled to correctly elicit current instances of the wanted category of mental object from this user 14. The Dialoguing Imperatives and their associated Dialoguing Knowledge templates may be edited in the KP 10 as experience is gained with the reliability of elicitations. When they are correct the user 14 response corresponds to a name that the user 14 associates with his/her current instance of the category of mental object that the KP 10 is attempting to identify within the mental environment of the user 14. The KP 10 records the user's response at an address in User Awarenesses block 18 and thus stores user-supplied names for in-context instances of the particular category of object that is required to successfully continue carrying on a useful dialogue.

RELATIONSHIPS BETWEEN THE KINDS OF MENTAL OBJECTS

The kinds of mental objects and the relationships between them are now summarized. This is accomplished by referencing the algebra that illustrates the multi-dimensional framework in which these mental objects are represented to exist and to interact. Appendix D, when read in conjunction with Appendix B, summarizes these relationships among the kinds of mental objects that are represented in the MIRR model. First there is described the information elicited about the Executive Agents and recorded in KP 10. The KP 10 is itself an Executive Agent of its users.

EXECUTIVE AGENTS & THEIR PROGRAMMING

The capabilities of programmed Executive Agents are described here in terms of their Skill Programming. By example, a programmed Activity (y) may be initiated within an agent (z) by sending the agent (z) a Start signal (Swyz). The program then runs on this Executive Agent producing the Activity (Awy). When the program has finished, the agent (z) provides a completion message (Mwyz). Index (w), that is common to all the three expressions, refers to the space-time locations of the Signal, Activity and Message responsivity. The Executive Agent might be an inanimate programmed computer system, or habituated human mental programming, or a predictable activity of some organized group of individuals.

There are limits to the predictability of individual or organizational Executive Agents. There are also limits to the predictability of poorly designed or maintained machines. These limitations are accommodated by invoking knowledge about probabilities of the different possible outcomes from signalling these agents in an attempt to invoke their characteristic behavior. The approach is to make the Activity (Awy) and completion message (Mwyz) two vectors or tables instead of single functions. Each element in the vectors may then include a probability term where the user assessment of the likelihood of this particular behavior is recorded. Like Probability Knowledge (block 18 (3d)), this enables users to modify the probabilities of occurrences of each possibility experientially. Thus, there are recorded the vectors (PjAjwy) and (PjMjwyz), respectively, in block 18 (4c,d).

A formal algebra is recommended for MIRR model objects, when representing the objects symbolically in basic templates. Specifically, for Executive Agents:

WIG(wyz)=W(Swyz) Iz(Awy) G(Mwyz).

This three address code is defined to indicate:
10 When (Signal Swyz is sent to AGENTz), I, AGENTz (start activity Awy). On completion, we Get (an "activity done" message Mwyz from AGENTz).

Recordings in User Awarenesses data base 18 area (4) give Agent names Iz stored in (4a) for the Executive Agents themselves, and three "addresses" Swyz in (4b), Awy in (4c) and Mwyz in (4d). Together the records specify the capability of the Executive Agent when viewed as a programmed system.

The formality of this algebra facilitates the design by dialogue experts of user-guiding messages and instructions (Dialoguing Imperatives and Dialoguing Knowledge templates).

It should be noted that Executive Agent programming may be considered as a high level instruction code that a known kind of Executive Agent is capable of interpreting and executing. Activity names (Awy) and messages (Mwyz) may be interpreted again and again through many levels of symbolic programming, before arriving at an actual physical Executive Agent that executes an activity at the physical electronic or mechanical level.

USER AWARENESSES OF SITUATIONS (SITUATIONAL ISSUES) & DELIBERATION

User Situations 18 (2) represent the user's Probability-and-Value-loaded images that appear in conscious experience and result from activation of the user's (primarily implicit) Skill Programming and Knowledge. User's situational Awarenesses are complex mental objects that are experienced in consciousness. They may include images and associated sensations. User Situations are formally represented in KP 10 data base 18 area (2) as:

10 VRwx, or PVRwx, or, more completely, anything up to PVRfghijkwxyz.

Rwx is the Reference to the state or object named x, which is understood (by a user) to exist at the space-time locality w. V is the Value or importance to the user of its being there. P is the Probability that such a state or object of this importance V did, does, or will, exist at this w, depending respectively whether w refers to a past, present or future space-time locality. The user who is aware of this PVRwx situation can also be identified in the algebraic expression as the aware person f, who may be user 14, but it may also refer to his/her awareness of another person's awarenesses. There is represented a Situation for person (f) as PVRfwx. If the importance or Value of the situation is derived from this person's Imperative (g), we represent this Situation (PVRfgwx), or (PVRfgkwy) in which the index (k) specifies a hierarchy of Values that pertain to making prioritizing assessments amongst a number of imperatives (g). Thus, Awarenesses of Situations are Probability and Value loaded images of named objects at specified space-time localities. Objects or states substantiated by sense and/or instrumented evidence have a Probability approaching 100%. Situations that did or will occur at past or future times or at distant localities may have much smaller Probabilities. The Value term is derived from the fourth term (Vfghijkw) in Imperatives (g) that make an Awareness of a particular Situation important to consider and possibly to act upon.

The MIRR model shows that the importance of situational Awarenesses to users derives its Value from user's Imperatives. Therefore, the polarity and the magnitude of the Value (importance) of a Situation comes from the polarity and magnitude of the triggered Imperative's Value/priority term. Situations in which the user sees him/herself at some space-time distance from an important objective (positive polarity), will cause the user to want to find a way to obtain the important objective. However, being in a Situation with a strong negative Value motivates the user to determine a way to escape from negatively Valued Situation.

As used herein, a Deliberation includes reasoning aimed at making a vague Awareness of a Situation, such as VRwx, into a much more completely defined Awareness that includes an action plan and its possible outcomes, PVRfghijkwxyz. In the MIRR model, problem solving involves processing the user's initial Situational Awarenesses, by making use of the accessible Knowledge and Skills, to obtain a more useful Awareness that includes the user 14 being able to "see" or "image" attractive action or intervention plans for a given set of Situational circumstances (objects or states). The MIRR process may be thought of in terms of navigating through the user's multi-dimensional mental space described in terms of fghijkwxyz, the coordinates of mental space in the addresses for User Awarenesses 18.

USER IMPERATIVES EMPOWERING MENTAL ACTIVITY

User Imperatives, as recorded in (1) in block 18, include wants, wishes, goals, drives, intentions, commitments, etc. of the user 14 or another identified person (f). Imperatives provide the user 14 with a sense of Value or importance to the user, of the user's Situational Awarenesses, as recorded in (2) in block 18 (User Awarenesses).

In that the same or simultaneous states or objects may trigger different Imperatives, it is important for each different Imperative to have a priority relative to all other Imperatives. Each Imperative, as considered herein, has four component elements, specifically:

18(1a) a type of triggering State;
19(1b) a type of triggered Action strategy;
18(1c) a set of Probable kinds of consequential States resulting from activating the Action strategy; and
18(1d) a priority or Value of a specific Imperative relative to all other Imperatives.

The Imperatives, as recorded in area (1) in block 18 of FIG. 1, may be considered to motivate the user's mental activity and to thus drive the user 14 to employ the user Knowledge, including explicit knowledge that is recorded in area (3) in block 18, to produce new, higher quality or more useful Awarenesses 18, from previous Awarenesses.

A general representation format for Imperatives is:

$$WIGEfg = [W(Rhw) \; I(Ahiw) \; G(PjRhijw) \; E(Vhijkw)]fg,$$

where (Rhw) represents a type of trigger State in a Situation, (Ahiw) represents a type of intervention or Action strategy, (PjRhijw) represents a set of Probability weighted consequent States (Situations), and (Vhijkw) represents the Value of this Imperative among other Imperatives. The index (h) represents a class of situational Objects, or States that trigger the Imperative, (i) represents a class of Action or intervention strategies that the user 14 desires to execute in response to appearances of any instances of an (Rh), (j) represents the different possible states and their respective Probabilities of existing as a consequence of the intervention, and (k) is an index signifying a relevant hierarchy of values for owners of Imperatives, for example, the particular user 14.

The four terms in the formal representation of Imperatives provide a link to the four different kinds of Knowledge. For example, a user cannot act on an Imperative unless the user also has the Object Knowledge to recognize instances of the Imperative's Triggering State. For example, there are cases where Skill Programming is used to recognize triggering States, but this is appropriate only for low level problem-solving situations, for example those faced by simple life forms for recognizing food. However, when the Imperative deals with objects or states in other space-time localities, or when it deals with more abstract objects or states, then Object Knowledge must be available so as to find instances of these more abstract Objects or States; The Object Knowledge and the Skills (programming) for using the Knowledge may still be implicit and used unconsciously. However, users, prompted by KP 10 dialogues designed by an expert, learn to make the Knowledge (or Skill) explicit.

Similarly, a user 14 can only act on an Imperative if there exists Skills Knowledge for programming a schedule of space-time activities of the Executive Agents required to carry out the triggered Action strategy. Again, as an example, simple life forms accomplish this by triggering pre-programmed (instinctive) Skills. Imperatives relating respectively to higher levels of problem-solving require correspondingly more sophisticated Executive Agents and Skills Knowledge about how to schedule their contribution to accomplishing a strategy.

The higher level Imperatives involve interacting Executive Agents and require the user to employ Probability Knowledge in order to estimate the probabilities for each result in a whole spectrum of possible outcomes. Similarly, higher level Imperatives require higher levels of Evaluation Knowledge in order to unravel the competing Imperatives that many (work) situations trigger into the user's consciousness.

As an example, it is believed that as managers work at higher levels in an organization the kind and sophistication of their Knowledge must increase if they are to be able to operate effectively at a specific level of work.

In summary, the domain of the Imperatives determines the domain of the Knowledge required to be able to satisfy the Imperative. A user 14 may regularly experience Imperatives that over-reach currently accessible Knowledge. This automatically translates into the Imperative (meta level Imperative) to seek out and expand Knowledge about the user's World and the user's position therein. Block F in FIG. 3 is where this realization is translated into a "Knowledge access" Situational issue for the user.

USER KNOWLEDGE & DELIBERATION

User Knowledge area (3) in block 18 records user awareness of Knowledge about relationships among the categories of mental objects, among categories of physical objects in space-time, as well as between physical and mental objects. As was previously stated, there are four general categories of Knowledge, including:

18(3a) Evaluation Knowledge,
18(3b) Object Knowledge,
18(3c) Skills Knowledge, and
18(3d) Probability Knowledge. Evaluation Knowledge 18(3a) is employed to order competing Imperatives (g) within a Values Hierarchy (k). This is necessary, for example, in order to resolve any inter-Imperative competition. Evaluation Knowledge is used to assign priorities to the Imperatives based on Value according to the Evaluation Knowledge available to user 14.

Object Knowledge 18(3b) is used, in response to User Imperatives, to maintain surveillance for instances of trigger objects. It is also used to ensure that important-feeling objects or states do in fact exist at the suspected space-time location. An example of this use is in resolving delusions about objects that have no objective reality. Finally, Object Knowledge may be used along with other categories of Knowledge, and with Skills, to estimate the probabilities that suspected situations did, do, or will exist, respectively, at some important remote space-time locality.

Skills Knowledge 18(3c) represents knowledge about which programmed Executive Agents (z) may perform what Activities, what signals are required as triggers to initiate the Activity, and also about the kind of Message to expect indicating completion of the Activity. Skills Knowledge 18(3c) is employed to structure a programmed procedure for scheduling the execution of Activities by Executive Agents, (4) in block 18 of FIG. 1.

In this regard, the space-time scheduling of programmed Executive Agents to produce future desired outcomes is accomplished by design. However, there are many mechanisms that are far too complex to be designed absolutely. One example is the interaction between many programmed Agents operating in the same space-time location (w). As mentioned above, useful knowledge in such probabilistic situations is considered to be Probability (mechanism) Knowledge 18(3d), where Probability (mechanism) Knowledge is defined to represent the contingent conditions that impact probabilities (Pj) among various possible outcomes of an action strategy. Probability (mechanism) Knowledge 18(3d) may be learned and accumulated experimentally (experientially), by acting, and then noting a result of the action.

The formal representations for each of the four types of Knowledge that comprise the user Knowledge recorded in the MIRR knowledge model are:

18(3a) Evaluation Knowledge: Ke[Vfghijkw]=[Vf-ghijkw =FUNCTION(fghijkw)];
18(3b) Object Knowledge: Ko[Rhw][W(Rhw) I(Ahwn) G(Mhwn)], n=1,2,3 ... ;
18(3c) Skills Knowledge: Ks[Awyz]=[W(Swyz) Iz-(Awy) G(Mwyz)]; and
18(3d) Probability Knowledge: Kp[PRhijw][W(Rhw) I(Ahiw) G(PjRhijw)].

In Ke[], the FUNCTION (fghijkw) may be a constant, or may be a function for finding Values ratios from (fghijkw) coordinates of some Situation.

In Ko[], the presence at space-time w, of a kind of object called Rh, is detected by a set of activities Ahwn which respectively generate response messages Mhwn, for n=1, 2, 3, ..., when an Rh is present. The n correspond to different senses for detecting attributes of an object at w of kind Rh. Thus, Ko[]provides an operational definition of Object Knowledge.

In Ks[], Skills Knowledge is defined as the programming of an Executive Agent. Reference is made to the previous description in EXECUTIVE AGENTS & THEIR PROGRAMMING. There may need to be provided vectors (tables) for PjAjwy and PjMjwyz in cases where the Executive Agents' behaviors are probabilistic, as noted above.

The definition of Kp[] describes that: When (contingent conditions Rhw) exist, and a specific or combination of Executive Agents, I, (executes an interventional action Ahiw), the results that are expected, according to this Probability Knowledge, (are within the spectrum of possibilities PjRhijw, in which each possibility has the Probability Pj). It should be noted that the user 14 may often know what possibilities exist, the Rhijw, but not what the Probabilities, the Pj, are. However, the essence of experiential learning is to conduct many cases of the experiment (replication) and find, by the distribution of the actual results among the possibilities, what the Pj values are that can be assumed under certain contingent conditions. The accumulation of Probability Knowledge is often a complicated, painstaking task. In general, many more people (operators) use Probability Knowledge than are willing and able to develop such Probability Knowledge (researchers). It is noted that this Knowledge model relates to the so called Scientific Method.

With these four kinds of Knowledge, all other Knowledge categories can be constructed by combination and replication at higher and higher levels of complexity. In this sense then, these four kinds of Knowledge provide a primitive set of knowledge categories that are very useful in representing business or other planning and management domains.

The foregoing definitions are taken to be objective definitions at a level of specificity that enable the implementation of the MIRR knowledge model that is the subject of this invention.

FLOW DIAGRAM OF THE MIRR METHODOLOGY

Figure 3A:
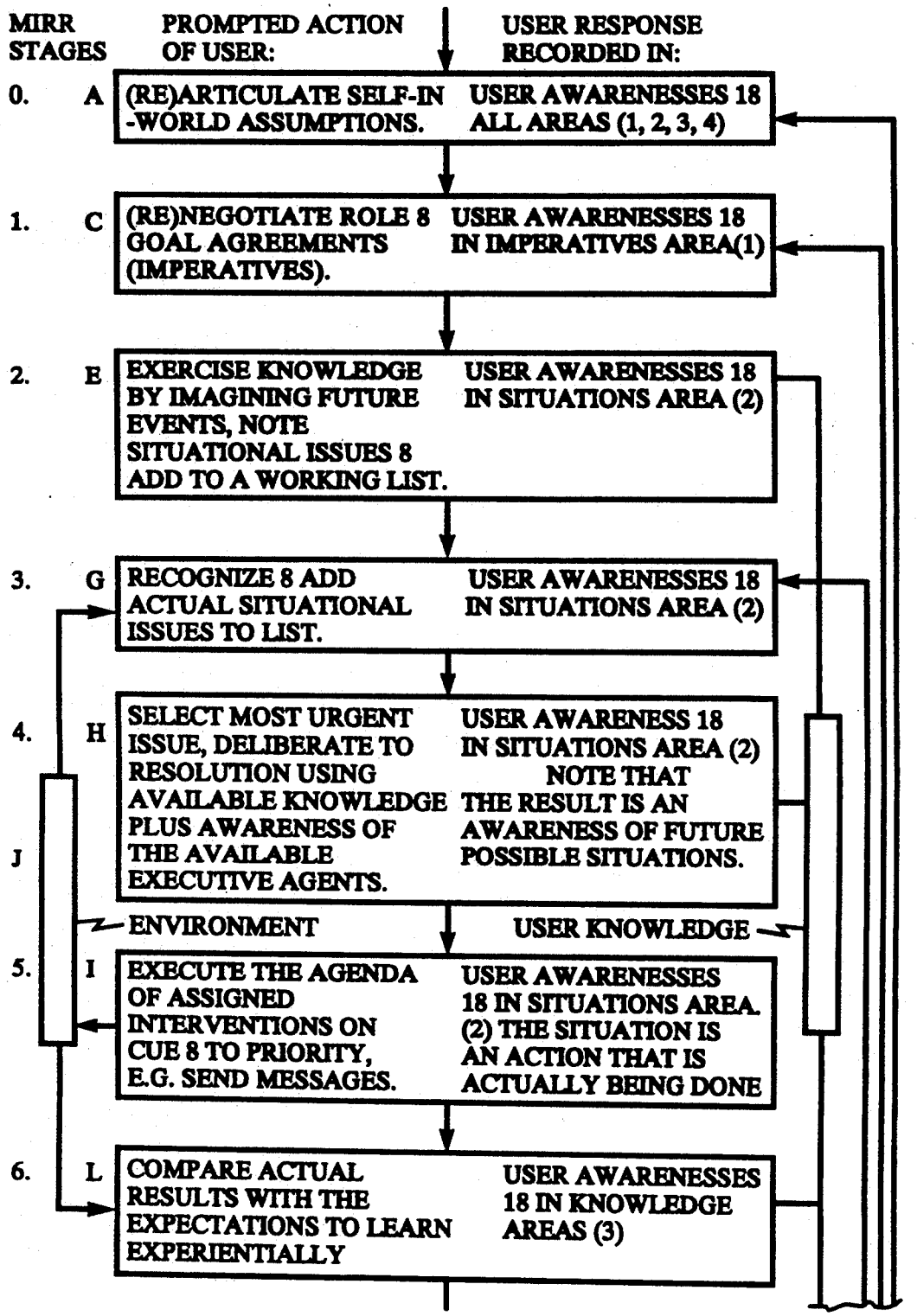
FIG. 3A and FIG. 3B are a flow chart illustrating the logic flow of a MIRR structured dialoguing session conducted between a user and the Knowledge Processor of FIG. 1.
Figure 3B:
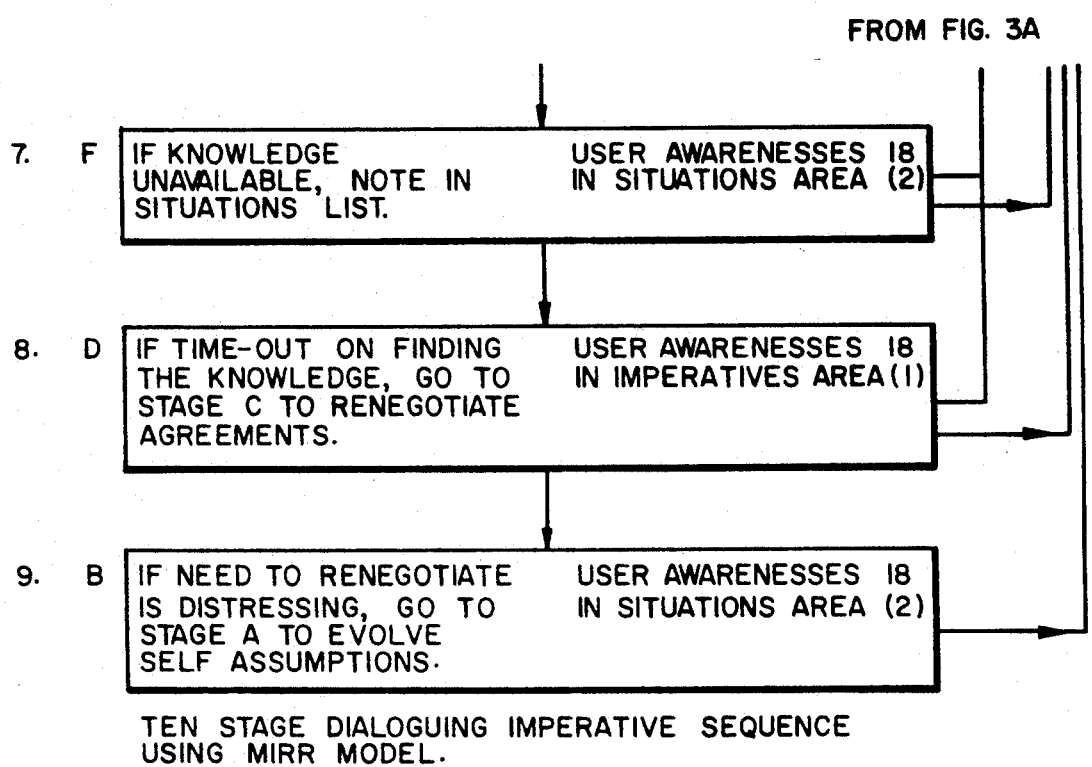

In accordance with an aspect of the invention, depicted in the flow diagram of FIG. 3A and FIG. 3B, there is now described a method for guiding the user 14 through the MIRR methodology. It should be noted that, although the flow diagram of FIG. 3A and FIG. 3B may appear to represent a linear flow, the method embodied therein is used at different levels of recursion when difficult issues are being recognized and resolved. Associated with each of the blocks of the flow diagram are the applicable User Awarenesses 18 areas of FIG. 1, so as to also illustrate the storage of the user 14 response information within the KP 10. The Dialoguing Control Interpreter 16 is employed for all steps that prompt or receive a response from user 14.

Recall that this methodology is programmed into KP 10 by dialogue experts who are knowledgeable about the MIRR model and the symbolic addressing algebraic representation thereof. The user need not understand this methodology to benefit from dialoguing with KP 10 via a programmed sequence and templates based on the MIR methodology.

The MIRR procedure has ten basic stages or steps:

An outer loop of the method evolves or develops the user's assumptions or model of who/what they are and can become in the world. To the extent that users can be guided to articulate these self assumptions, they are recorded (Block A) in terms of sets of Imperatives, Situations, Knowledge or available Executive Agents. If user 14 finds discrepancies when acting on his/her self-in-World assumptions (Block B), the user is encouraged to evolve the integrity of the user's self-model (Block A). Both of these steps involve generating and updating the User Awarenesses 18 in FIG. 1. At a minimum, KP 10 records the fact that these steps were attempted by the user 14. If user 14 is sufficiently aware of his/her assumptions, then references to such assumptions are recorded in the User Awarenesses 18 data base for later reference and updating by the user 14.

It should be noted that the MIRR model assumes that discrepancies in the user's self assumptions are signalled to the user 14 by his/her own (often unconscious) basic Imperatives, and that they appear as emotional signals associated in consciousness with user awarenesses of important feeling Situations. One of the objectives of the KP 10 is to facilitate research of this assumption (hypothesis) about the origin of a users' emotional distress.

Between these two steps of the outer loop are a number of intermediate steps that define several inner-loops of the method. At Block C the user 14 makes Agreements which generate Imperatives, references to which are recorded. While at Block D, Agreements (Imperatives) which can't be honored because of problems with access to Knowledge, are registered for renegotiation. When renegotiation is accomplished, Block C, Values associated with Imperatives may be modified. This may involve an update to the Evaluation Knowledge employed by user 14. At Block E the User Knowledge (Block K) is exercised by imagining future possible Situations that might require user 14 to make knowledge-based resolutions. These are added to user 14 list of Situational issues 18(2) in block 18 of FIG. 1. At Block F any Knowledge access problems are registered as Situational issues 18(2) needing resolution. At Block G the user 14 is prompted to record all important immediate Situational issues, recognized Situations being stored or registered within area 18(2) of the User Awarenesses 18. At Block H a deliberation based on the accessible Knowledge (Block K) is accomplished so as to attempt to select an intervention (action) strategy. User 14 then tests the chosen intervention strategy at Block I through an interaction with the environment, or with a model of the environment (Block J). Based on this test, learning is achieved (Block L). That is, the user's Knowledge (Block K), including records of same 18(3) FIG. 1, are updated. Also, the step (Block H) of planning the intervention with an environment (Block J) may uncover some previously unknown Situational issues, resulting in newly discovered Situational issues being stored, or registered, within User Awarenesses Block 18(2) of FIG. 1.

BLOCK FLOW DIAGRAM OF KNOWLEDGE-BASED DELIBERATION STEP

Figure 4A:
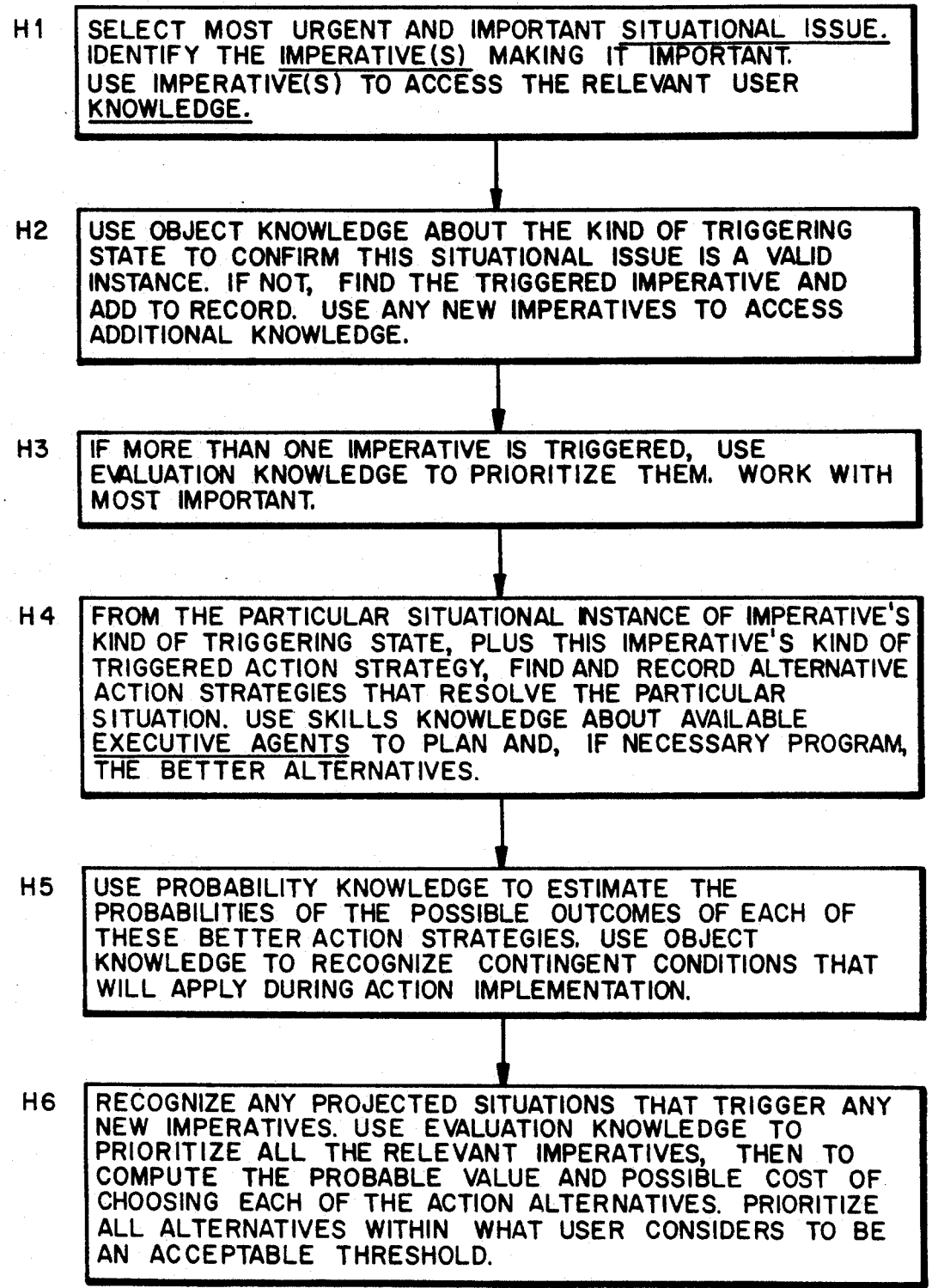
FIG. 4A and FIG. 4B are a flow chart illustrating in greater detail the deliberation step of FIG. 3A.
Figure 4B:
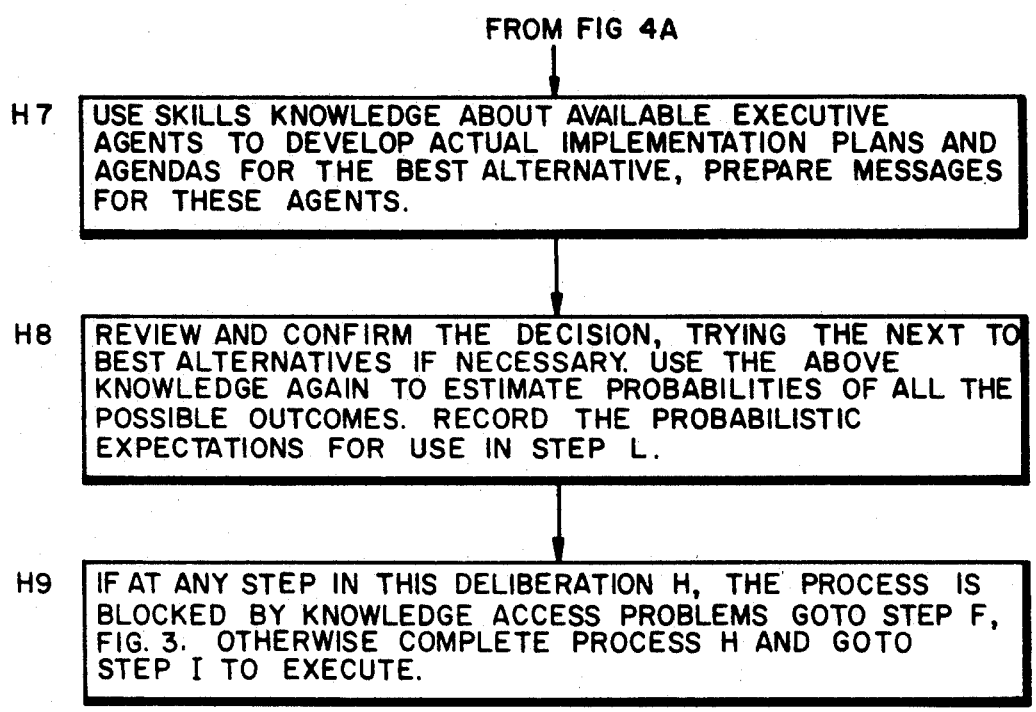

In accordance with aspects of the invention, depicted in the flow diagram of FIG. 4A and FIG. 4B, there is now described a method for guiding the user 14 through the deliberation stage of the MIRR methodology. It should be noted that although FIG. 4A and FIG. 4B shows a linear flow, the process can be interrupted at any step by difficulty in accessing necessary Knowledge. Furthermore, different Situational issues may be in this deliberation process at the same time. Therefore, the user 14 may leave this process at any stage, depending upon where the deliberation has then reached at that time, and return at a later time to continue. For example, if a Knowledge access problem occurs, the further deliberation of that Situational issue for which this occurred is suspended, until such time as the necessary Knowledge access is gained, or else the agreement that produced the driving Imperative in the first instance (step C) is registered in step B for renegotiation at step C. Appendix D describes the relationship between the types of mental objects, including the four types of Knowledge, that are the logic basis of the deliberation process.

At step H1, the user 14 is prompted to select the then most urgent and important Situational issue for deliberation. Next, user 14 is prompted to identify the Imperative(s) that are making this Situation important for the user 14 to deliberate to a resolving action. As described in Appendix D, the user 14 Imperatives provide the mental linkage from the Situational issues to the user 14 Knowledge for accomplishing the deliberations. It should be remembered that, as depicted in FIG. 3 block E, users are encouraged to follow up agreements made to accept any new role and goal assignments for themselves with an exploration of what kinds of Situations might arise in the course of satisfying the mental Imperatives that these same (social) agreements generated. In accordance with the MIRR model, these mental (Psychological) Imperatives are direct outcomes of the user's more basic Imperatives, ones that try to maintain the integrity of their self-in-the-World image (model), while testing the limits to what-they-could-become-in-the-World. If the user 14 correctly projects the kinds of future Situations that require his/her deliberated resolution, he/she would have been able to pre-test the availability of the necessary Knowledge for doing this. Different users may tend to either over reach or under reach their Knowledge capabilities when making agreements. This difference determines the efficiency with which deliberation of actual Situations can occur. The more the user 14 prepares the Knowledge likely to be needed to satisfy an actual Situation, the less any urgent Deliberation will be interrupted by Knowledge access problems. A purpose of research and education is to prompt Knowledge access problems by predicting future Knowledge requirements and then attempting to acquire access to this Knowledge.

At step H2, the accessible Object Knowledge is employed to confirm that, in fact, the Situation that is important to the user 14 is made important by the Imperative(s) identified above in step H1. If after careful examination of the evidence in the Situation shows its association with the selected Imperative to be delusionary, the user 14 is prompted to find the real Imperative, then to record this in the User Awareness 18 area (1). This addition of another Imperative may then provide access to more Knowledge.

It should be appreciated that many users will require coaching in the process of exploring the relationships among their important-feeling Situations, the Imperatives that make them feel important, and the Object Knowledge that links the general kind of triggering States in Imperatives to the particular Situation that user 14 considers to be Important. When a user 14 who is dialoguing with KP 10 comes up against this difficulty, and registers this fact in response to a standing question from KP 10, then KP 10 directs the user 14 to step F, to be further directed by KP 10 to where and how they can obtain help in finding the required Knowledge. It should be noted that the MIRR methodology not only guides the user 14 through the user of the four kinds of Knowledge in the MIRR model, but that the KP 10 also becomes aware of which kind or kinds of Knowledge the user 14 is deficient in. This KP 10 awareness of the user 14 difficulty facilitates the providing by KP 10 of help to the user 14 in accessing required new Knowledge.

At step H3, the user 14 is directed to use his/her accessible Evaluation Knowledge to prioritize the triggered Imperatives, if more than one Imperative has become associated with the importance of the Situation. It should be noted that at step H6 these other Imperatives may need to come up again for consideration. Note also that user 14 difficulty in accomplishing this step leads KP 10 to prompt user 14 to go to step F of FIG. 3B to resolve the Knowledge problem.

At step H4, user 14 is prompted to review the current Imperative's triggered Action strategy, along with the Situation currently under consideration, to imagine the particular Action strategies that could be applied to satisfy the Imperative under the current circumstances. These Action strategy alternatives are named or described and recorded in block 18(2) for future reference by the user 14. Next, user 14 is prompted to employ accessible Skills Knowledge about available Executive Agents, in order to plan and if necessary program a proforma schedule of actions by different Agents to accomplish the better action strategy alternatives. How many action strategies are test-programmed is a matter of experience that the user 14 acquires or remembers from previous action strategy planning. In general, only enough alternatives should be evaluated to be able to proceed with the deliberation without recursively executing step H4 so as to try other Action strategies when the chosen Action strategies few prove unsuitable to the user 14.

At H5, the user 14 is prompted to user the available Probability Knowledge to estimate the probabilities of the possible outcomes of each of the Action strategies. The user 14 is further prompted to use Object Knowledge to recognize the critical contingent conditions or states that will apply during the implementation of the Action strategy, and which are featured as contingencies in this Probability Knowledge. In this manner, user 14 is prompted to incorporate more sophisticated problem-solving methods should these be necessary to plan an Action strategy under complex probabilistic circumstances. Again, if user 14 has difficulty with this additional thinking complexity, the user 14 is prompted to go to step F of FIG. 3B to obtain help with the Knowledge access problem that is indicated.

If it is necessary for the user to plan changes in the current contingent conditions, in order to obtain an acceptable probability that the wanted results will in fact ensue from the available Action strategies, then producing these changes becomes one more set of Action strategies to be accomplished by available Executive Agents as part of the overall action plan.

At step H6, any Situations that are likely to arise in the implementation of the Action strategies under consideration may themselves trigger new Imperatives. If this likelihood is significant, as indicated in estimates made above (step H5), then the user 14 is prompted to consider the impact on the user 14 of these other Imperatives being triggered, in terms of the probable value and possible cost to the user 14 in his/her roles. It should be noted that this step is in fact done by many people, but less consciously than is proposed here. Thus, the MIRR methodology is intended to raise the user 14 awarenesses to the mental processes that he/she may already be employing in an unconscious, and perhaps unsystematic way.

The main Action strategies and the associated considerations as described above are now reviewed by the user 14, under KP 10 prompts, in terms of the probable value and the possible cost of choosing each alternative. A general method which the user 14 is prompted to consider for choosing among alternative Action strategies is to maximize the probable value of the choice, while not exceeding a user 14 threshold of "pain" or "damage" from possible loss, in case that possibility does in fact materialize.

At H7, the chosen Action strategy is planned and programmed for execution by the available Executive Agents, using Skills Knowledge available to user 14. Again, if there are problems with the available Skills Knowledge then KP 10 prompts user 14 to go to step F to resolve the noted Knowledge access Situation before proceeding with the step H7. Any messages that user 14 is required to send to selected Executive Agents are also prepared here.

At step H8, the above choice of Action strategy and plan, including what Executive Agents will be employed, is reviewed and confirmed under KP 10 prompts. If too much uncertainty exists, the choice may be modified by repeating some or all of the deliberation steps. The user 14 is finally prompted to summarize and record his/her expectations (including any Probabilities based on Knowledge limits about the alternative outcomes), for use later in step L. In step L of FIG. 3A the KP 10 prompts user 14 to compare the actual occurrences with the expectation probabilities, in order to learn by updating the probabilities in the relevant Probability Knowledge, 18(3d).

Finally, at step H9, the user is prompted to proceed to step I of FIG. 3A to execute the chosen and planned Action strategy. Often, this is accomplished by sending the appropriate messages to the available Executive Agents.

As described above, if at any step in the deliberation process, the user 14 is unable to proceed for want of access to the needed Knowledge, then the user 14 is prompted to go to step F of FIG. 3B to register, and hopefully to resolve, this Knowledge access problem before returning to continue the deliberation, or else to abandon it and to register this abandonment of the resolution attempt as a Situational issue (step G) for consideration.

RESOLVING KNOWLEDGE ACCESS PROBLEMS

Resolving Knowledge problems is essentially the same deliberation process that is used for resolving any Situational issue, except that the user 14 needs to have access to Knowledge of Knowledge development and exchange, rather than Knowledge of some other (e.g. business related) domain. The MIRR Knowledge model accommodates this so called metal Knowledge by defining and using the model's four kinds of user Knowledge. Thus, the Knowledge about how to obtain access to each different kind of knowledge is given very specifically to user 14 when he/she desires access to it. As was stated, Knowledge domain experts design the Dialoguing Sequences and Dialoguing Knowledge templates for guiding users. The principles used as a basis for the dialogue design are elaborated below.

GAINING ACCESS TO NEW OBJECT KNOWLEDGE

As was described above, Object Knowledge is contained as a specification for what set of Actions (Ahwn for n=1,2,3,,) produce what corresponding set of response Messages (Mhwn) respectively, when executed in space-time (w) where an instance of (Rh) exists. It should be realized that kinds of Objects called (Rh) are only of interest to user (or anyone else) if they are triggering States in the user's (or other's) Imperatives. That is, according to the MIRR Knowledge model, Objects or States of interest are defined in mental space, not in Physical Space, although of course, many instances of this kind of Object or State might in fact exist there. Actual Physical instances of known kinds of Physical Objects or States might each deviate in detail from the "quantized" definition specified in mental space. For example, some of the (n) values may indicate that the same scanning/sensing Action (Ahwn) may produce inconsequentially deviant Messages (Mhwn), and yet inform the user 14 of an instance of the existence of the Object.

In that Object Knowledge is based on mental objects, it is defined rather than being discovered, even though the useful definitions are based on what can be discovered in Nature, including the user's sets of mental Objects and States. Therefore, if the user 14 is experiencing an Object Knowledge access problem, the solution is to be found in communication with others and with oneself over time, to establish agreed definitions of the sets of attributes (Mhwn responses respectively from Ahwn scan/sense Actions) that inform the user 14 how to recognize instances of the target Object.

GAINING ACCESS TO NEW SKILLS KNOWLEDGE

Also as was described above, Skills Knowledge is Knowledge concerning the programming of Executive Agents. Programming is a matter of designing a structure in space (e.g. a symbolic program) recorded in some media, that the Physical Executive Agent can execute to generate a process in space and time. This activity is analogous in some ways to computer programs that may require debugging before they will faithfully generate the intended Activity under different circumstances. Testing and debugging of the programs is done by the designers who understand the intended activity.

Humans also develop mental programs by the repeated practice of the same routine. Similarly, groups of people become habituated in their responses, as a group, to certain repeated provocative messages.

Acquiring Knowledge about which Executive Agents tend to execute what activities in response to certain incoming signals is generally by communication from others, for example by communication from the experts who wrote the program or designed the computer. Catalogues of programs provide Skills Knowledge about the programs, including what kinds of Agents (computers) they run on. In the case of individual humans, groups, or organizations it may be more difficult to become consciously aware of the Skills Programming to the point where it becomes available to an individual as explicit Skills Knowledge.

This Skills Knowledge is either supplied by the designer of the program, including the person who habituated others to behave in a certain manner, or it is acquired by (repeatedly) observing the Executive Agent in action. Many people acquire Skills and Skills Knowledge that remain implicit, but can be invoked in habituated ways. An example is the capability, that many people learn, for manipulating others by treating them are predictable, habituated Executive Agents.

If others (e.g. experts) have made observations of Executive Agents, and have recorded the Skills Knowledge, users can acquire this Knowledge by communication. For convenience, Executive Agents are often classified into different kinds.

It should be remembered that the variation on Skills Knowledge, where the Executive Agents, especially the human ones, exhibit one of a set of possible behaviors, each with probabilities of these occurring, may be acquired by repeated experience with the Executive Agents' behaviors. This type of Skills Knowledge merges into Probability Knowledge, as described below.

GAINING ACCESS TO NEW PROBABILITY (MECHANISM) KNOWLEDGE

Probability Knowledge may be acquired by experience, by hypothesizing the possibilities, and then subsequently testing to determine what the Probabilities are of each of the possibilities actually occurring. More sophisticated experiments may be needed to discover and describe contingent conditions that affect the distribution of the Probabilities of various outcomes. These and other aspects were described above in USER KNOWLEDGE & DELIBERATION, in regard to Kp[ ], Probability Knowledge.

Once Probability Knowledge, or any other types of Knowledge, has been developed and documented in the MIRR format, it may be communicated to a user via records in the User Knowledge area 18(3) of the KP 10. The expert may thus be considered to be a user who leaves useful records for others.

GAINING ACCESS TO EVALUATION KNOWLEDGE

Evaluation Knowledge differs from the other three types described herein in that it tends to either be a matter of Social agreement, or to be a function of a Bio-Psychological design of humans. Evaluation Knowledge is used to prioritize potentially competing Imperatives. Biologically programmed Imperatives may be observed in the preferences exhibited in behaviors. At the other extreme, a society's Evaluation Knowledge is a matter for Social agreement. Often, in the view of children or other Physically or emotionally dependent humans, these agreements are extracted (perhaps subliminally) under force from persons with control of resources whose availability can be manipulated. Even in the case of Social agreements, according to the MIRR model, evolution will tend to make them more over time towards the generic Imperatives programmed into "everybody . In the meantime, different individuals, groups, and societies develop, then try to propagate, their own particular Evaluation Knowledge (referred to as Values Hierarchies) based on their own accumulated experiences. It should be noted that the more universal the basis of an Evaluation Knowledge set, the (k) coordinate in the MIRR model of mental space, the more likely it is to have longevity over time and resonances across many societies.

The MIRR knowledge model, as applied by dialogue experts, is intended to enable users to make situational problems and opportunities more explicit, then to facilitate their much more systematic resolution. This functionally extends equally to solving debilitating problem situations, and to exploring the possibilities that might be available for further evolving a user's capabilities.

As an example, business practices have developed ritual beliefs about sets of Evaluation Knowledge that have near universal agreement. Of course, such agreements are important requirements for success in doing business together. An example of a near universal Evaluation Knowledge function is known as Expected Systems Dynamic Return of Assets. This function can be calculated for business plans so as to measure the Value of these plans as seen by the business executives and all other concerned parties. This measure is widely adopted, but not well understood, as an explicit part of the business managers' Evaluation Knowledge, even though this Knowledge is extremely important for successfully making/executing business plans. Such Knowledge, as described above, can be communicated from expert user to any interested user via records made in the User Awareness 18(3).

In business organizations there is a structural logic to the development of Evaluation Knowledge for prioritizing alternatives when making plans for a business. At the lower levels, and especially in hierarchical kinds of organization structures, "the boss" is often considered the authority on what is more and what is less important. At the level of a Business Unit, "the customer" is considered to be the authority on what products and services are more versus less important. The Business Unit manager is required to translate the customer's sense of what is more vs less important, into an important rating for the possible activities of the Functions (Engineering, Manufacturing,...). The Group Manager sees Business Units as responsible for business in their assigned segments. Thus, the Group Manager, who may be responsible for a group of Business Units and/or Functions, prioritizes her/his activities so as to ensure effective integration of activities of the Business Units and Functions. At a next higher level, for example an Executive Committee, prioritizing is done in terms of the most important strategies for deploying organizational resources that will maximize the likelihood of achieving strategic mission objectives. At the CEO level the prioritizing of strategic alternatives is based on the viability of these alternatives in the context of a realistic World model. That is, in the context of realistic Economic, Social, Psychological, Managerial and Technological models. These examples are given to show the usefulness to designers of management systems, including organization structures, of the concept of Evaluation Knowledge. Typically, Evaluation Knowledge flows down while the Knowledge about what might be possible to do is generated lower down in hierarchies where the work is actually done. In non-hierarchical structures the same differentiation exists between the knowledge contribution responsibilities in different managerial and knowledge worker roles.

In operation, when a user 14 seeks access to new Knowledge and chooses to go to step F of FIG. 3B, the user 14 finds that the KP 10 has been programmed by the dialogue expert to make a record of the kind of Knowledge that the user 14 desires (Evaluation, Object, Skill or Probability), and to direct the user 14 to Knowledge recorded by other users, often experts, in 18(3a, b, c or d) respectively. It should also be noted that besides actual Knowledge records, KP 10 may provide expert users' opinions as to who might be a useful source of the needed Knowledge. Often we exchange Knowledge by dialoguing with one another in relatively unstructured ways. This option is thus still accommodated within the invention. However, its main purpose is to go beyond support of general dialoguing to much more deliberately structured communication.

Thus, step F of FIG. 3B prompts the user 14 to register the Knowledge access deficit and then, or at a later and more convenient time, to act on the Knowledge access Situation. Meanwhile, the KP 10 notes the place in the dialogue where the deficit was exposed. This information aids the expert dialogue designer to guide the user 14 efficiently to the probable User Awarenesses 18(3) location where useful help is available for the user 14.

SUMMARY

A Knowledge Processor based on the novel MIRR Knowledge model and its associated model of mental objects has been described. The detail given concerning the operation during user dialogues with the invention based on the MIRR model are to be considered representative of dialogues which experts can develop based on the invention of the KP 10 which incorporates these MIRR structures in its User Awarenesses data base. Many other dialogues can be developed by appropriate experts, in like manner to the many different programs developed by expert systems designers and programmers for general purpose computers.

By example, another important application of the invention is in the implementation of a medical diagnosis system wherein a user, typically a physician, interacts with the system to determine one or more possible diagnosis for a given patient based upon the patient's symptoms and other information. For this system, the User Awarenesses data base includes Imperatives of the User, which include a desire to determine the nature of the patient's illness. Other Imperatives may include one to treat the patient so as to minimize discomfort, to treat the patient non-invasively, etc. The User Awarenesses data base includes a type or types of Triggering States, which correspond to the patient's symptoms and other information, such as the patient's age and weight. The type or types of Action Strategies correspond to possible treatments, each having a spectrum of outcome Probabilities. Executive Agents may include other physicians, other healthcare workers, and/or specific diagnostic or treatment apparatus. The knowledged that is developed, shared, and applied by users of the system relates to improving the diagnosis, treatment strategy selection, implementation management, and learning by the user.

A significant utility of the invention is thus in providing a general Knowledge Processor as a platform on which to program Knowledge Processors for many professional domains. Additional value is provided by the MIRR Knowledge structure that is integrated into the KP 10 User Awarenesses 18 data base, for describing mental space in a powerful enough manner so as to enable the Knowledge Processor to gain access to users' names and descriptions of Objects and States in users' mental spaces. This enables the Knowledge Processor to process records of User Awarenesses to guide users through increasingly more effective mental functioning, dependent on the skills of the available dialogue designers.

While the invention has been particularly shown and described with respect to a preferred embodiment thereof, it will be understood by those skilled in the art that changes in form and details may be made therein without departing from the scope and spirit of the invention.

APPENDIX A

```
(1) User Imperatives: where records of their component elements are:

(1a) kind of triggering State
            (1b) kind of triggered Action strategy
            (1c) set of Probable kinds of consequential States
            (1d) Value rating of this Imperative vs others (2) User Situations: where records of their component elements are:

(2a) name used for referencing this Situation
            (2b) space-time locality of the situational State
            (2c) level of importance (Value) of the Situation
            (2d) Probability of existance of this Situation (3) User Knowledge:  where records of kinds of Knowledge include:

(3a) Evaluation Knowledge
            (3b) Object Knowledge
            (3c) Skills Knowledge
            (3d) Probability Knowledge (4) Executive Agents: where records of Agent's capabilities include:

(4a) Reference to or name of the Executive Agent
            (4b) triggering Signal invoking Agent's activity
            (4c) the Activity that is then produced by Agent
            (4d) "activity-done" Message expected from Agent
```

Further detail of the sub-structure of the User Awarenesses data base within the MIRR model type of knowledge processor.

APPENDIX B

```
(1) User Imperatives: WIGEfg = [W(Rhw) I(Ahiw) G(PjRhijw) E(Vhijkw)]fg (1a) (Rhw) are kinds of triggering States
    (1b) (Ahiw) are kinds of triggered Action strategies
    (1c) (PjRhijw) kinds of Probability spectra of consequential States
    (1d) (Vhijkw) are Values (relative importances) of the Imperatives (2) User Situations:   PVRwx for simple situations, and PVRfghijkwxyz
                       for the much more complex situations where:

(2a) Rx or Rfghijkxyz are names for Referencing Situations
    (2b) w  are space-time localities of Situational States
    (2c) V  are levels of importance (of Value) of Situations
    (2d) P  are Probabilities that the Situations did, do or will exist (3) User Knowledge: K[fghijkwxyz] meaning Knowledge about relationships
                    that are represented in the user's Mental Space.

(3a) Ke[ ] are references to Knowledge of (how to do) Evaluations
    (3b) Ko[ ] are references to Knowledge of Objects or structures
    (3c) Ks[ ] are references to Knowledge of Skilled Executive Agents
    (3d) Kp[ ] are references to Knowledge of Probability mechanisms
```

```
(4) Executive Agents:  WIG(wyz) = [ W(Swyz) Iz(Awy) G(Mwyz) ]z (4a) Iz are reference names for Skill-programmed Executive Agents
    (4b) (Swyz) are action triggering Signals for the Agent z
    (4c) (Awy) are the Skill-programmed actions performed by Agent z
    (4d) (Mwyz) are the "activity-done" Messages from the Agent z
```

Further detail of the user Awarenesses data base structure.

Experts who create (program) Dialoguing Knowledge templates for various
Dialoguing Imperatives        interpret the above terminology as follows:

(1) USER IMPERATIVES, [W(Rhw) I(Ahiw) G(PjRhijw) E(Vhijkw)]fg terms mean:
W( ): When there is an instance of the triggering State ( )
I( ): I, the user, want Executive Agents to do Action strategy ( ) to
G( ): Get the consequential set of Probable results ( ), and I, the user
E( ): Evaluate this Imperative as having a relative importance rating ( )

(2) COORDINATES OF USER SITUATIONS: fghijkwxy and z mean:
f       Persons
g       Imperatives
h       Kinds of Situational States
i       Kinds of Acton Strategies
j       Spectra of Probable results
k       Values Hierarchies
w       Space and Time taken together
x       Particular Situational States
y       Particular Action Strategies
z       Particular Executive Agents (3) USER KNOWLEDGE, Ke[], Ko[], Ks[], Kp[] catagories mean:
(a) Evaluation Knowledge   Ke[Vfghijkw] = [Vfghijkw = Function (fghijkw)]
(b) Object Knowledge       Ko[Rhw]      = [ W(Rhw) I(Ahwn) G(Mhwn) ]
(c) Skills Knowledge       Ks[Awyz]     = [ W(Swyz) Iz(Awy) G(Mwyz) ]
(d) Probability Knowledge  Kp[PRhijw]   = [ W(Rhw) I(Ahiw) G(PjRhijw) ]

In Knowledge for making Evaluations: Vfghijkw = Function (fghijkw):
Value Vfghijkw is some stated or named function of indices fghijk and w.

In Knowledge for recognizing Objects or States: W(Rhw) I(Ahwn) G(Mhwn):
When an instance of Rh actually exists at space-time locality w and I do
activities Ahwn there then, I get the respective messages Mhwn, n=1,2,3,.

In Knowledge for describing Executive Agents: W(Swyz) Iz(Awy) G(Mwyz):
When signal Swyz is given to agent z, this Agent will execute activity
Awy and when the activity is completed, it will send the message Mwyz.

In Knowledge describing Probability mechanisms W(Rhw) I(Ahiw) G(PjRhijw):
When and where an instance of the contingent conditions Rhw exists, and I
do activity Ahiw there then, I expect to get consequential results which
falls within the Probability spectrum represented by PjRhijw.

(4) EXECUTIVE AGENT RECORD COMPONENTS, [W(Swyz) Iz(Awy) G(Mwyz)]z mean:
Iz are recorded reference names for the user's Executive Agents,
W(Swyz) means When (Signal Swyz is sent to Executive Agent z), then
Iz(Awy) means Iz, Executive Agent z, (executes activity Ay at w), and
G(Mwyz) means that Executive Agent z sends activity-done Message (Mwyz).

FURTHER DETAIL OF ADDRESSING ALGEBRA FOR DIALOGUE DESIGNERS.

APPENDIX C

ILLUSTRATIONS OF DIALOGUING IMPERATIVES & KNOWLEDGE TEMPLATES.

An illustration of the high level instruction format for use in the design of Dialoguing Imperatives, and the form of the corresponding Dialoguing Knowledge templates are given below.

These example instructions illustrate a programming language suggested to dialogue design experts for interpretation by the Dialoguing Control Interpreter 16. The illustrated dialogue steps are samples taken from the Initialization step when a user first approaches the KP 10 system, then Figure 3, blocks A, B, C, D, E, F G, H, I and L, and from Figure 4 (all).

Dialoguing Imperative instruction addresses "DInq" key to corresponding Dialoguing Knowledge templates "DKnq". These addresses are in 20 and 22. The n are serial numbers referring to the pre-programmed Dialogues, while the q are instruction (question) serial numbers recording where the user is in the sequence for the current dialogue (first instruction is q=0). The (m) is the serial number for the current dialogue with KP 10. One user (f) can be engaged in different dialoguing sessions (different m) with the same or different pre-programmed Dialoguing Imperatives (n) and be at different instructions (question numbers q) with each (n) and (m). Furthermore, different users (f) can be so engaged with the same KP 10.

PRE-ASSIGNED LOCATIONS IN USER AWARENESSES DATA BASE 18:
The serial number for the KP 10 is recorded in 18(4a)00. The (m) dialogue serial number is in 18(4a)01. The available pre-programmed Dialogues (n) are named and recorded in 18(4a)00-0n for user reference and selection.

References to User Awarenesses of pre-programmed Dialoguing Imperatives are recorded in 18(4), indicating these are Executive Agents of users.

18(4a)00-0n are names of these capabilities (e.g. n=1 for MIRR sequence),
18(4b)00-0n are respective pointers to their first instructions $Sw(y=n)z$,
18(4c)00-0n are descriptions of dialoguing sequence Activities $Aw(y=n)$,
18(4d)00-0n are names of the respective Activity done Messages $Mw(y=n)z$.

If we want the KP 10 to be self aware, then we assign a person number, f=0 say, to KP 10. We can then record in 18(2) the fact that KP 10 (f=0), has awareness of the Situation that KP 10 has the capabilities described in 18(4)00-0n. Of course, experts are the only ones likely to use this kind of self awareness by KP 10 of its own pre-programmed repertoire of dialogues, as described in the Executive Agent's own awarenesses areas.

In the templates described below, the < > mean fetch the content at the indicated address, while the [ ] mean store the user's reply at this indicated address. The addresses are in User Awarenesses data base 18.

Note that the Dialogue Control Interpreter does not have to understand the words in the "DIn" instructions. They are for designers of templates. The operative addresses a·   in :he < > and [ ]. The verbs, or operations to be performed are in t.   ar text for the user to respond to, but in the part of the template e..:uted by the Dialoguing Control Interpreter, the verbs and symbolism would be encoded for machine interpretation.

INITIALIZATION:

DI0.  W(user approaches KP 10 to initiate a new dialoguing session)
      I(get user name and offer the full menu of Dialoguing Imperatives)
      G(user choice of current dialoguing session in program pointer)

DK0.  TEMPLATE OF INSTRUCTIONS TO USER 14:. (m, n, f and q need not show)
```
.----------------------------------------------------------------.
|You are beginning a new dialoguing session m = < 18(4a)01 > with|
|the MIRR Knowledge Processor #< 18(4a)00 >.                     |
|                                                                |
|Please enter your name here: f = [ 18(2a)m0 ].                  |
|                                                                |
|Make your selection from the following menu of pre-programmed   |
|dialogues:                                                      |
|< 18(4a)00-0n >.                                                |
|                                                                |
```

```
|Enter your selection here: n = [ 18(2a)m1 ]. When your selection|
|is made type "done" or anything here [ 18(2a)m4 ].              |
|                                                                |
|If at any time you need help in understanding how to proceed,   |
|type "help" or anything here [ 18(2a)m3 ]                       |
```

INSTRUCTIONS TO DIALOGUING CONTROL INTERPRETER (a special "user").
```
|put < 18(4b)0n > into [ 18(2a)m2 ] .                            |
```

NOTES: 18(4b)0n holds the pointer to the first instruction of dialogue n,
18(2a)m0 holds the current user name f,
18(2a)m1 holds current user-selected dialogue n (20b in Figure 1),
18(2a)m2 holds current program counter pointing to step q in n,
18(2a)m3 holds flag signalling that user f needed help at q in n.
18(2a)m4 is a working store location for signalling user is done.

FIGURE 3, STEP G (part 1):

Figure 3, step G (part 1), recognizing and adding additional important
Situation names to the user's working list, or editing the current list.

DInq1. W(user chooses menu item q=G1 (inside MIRR sequence, n=1 say)),
       I(prompt user to add to/edit working list of important Situations)
       G(updated working list of important Situation names in 18(2a))

DKnq1. INSTRUCTIONS TO DIALOGUING CONTROL INTERPRETER.
```
|Copy < 18(2a)fxt > into editing space [ 18(2a)m5x ].            |
```

NOTES. 18(2a)fxt is working list of names of Situations of user f at t,
       18(2a)m5x is a working area where user may edit the list, x=1,2,, TEMPLATE OF INSTRUCTIONS TO USER 14: (m, n, f and q need not show)
```
|You are at step q = < 18(2a)m2 > of dialogue n = < 18(2a)m1 >.  |
|                                                                |
|Your current working list of important Situations is:           |
|< 18(2a)m5x >                                                   |
|                                                                |
|Please edit or add to this list. When you are done editing and  |
|adding to this list, type "done" or anything here [ 18(2a)m4 ]. |
|                                                                |
|If at any time you need help in understanding how to proceed,   |
|type "help" or anything here [ 18(2a)m3 ]                       |
```

INSTRUCTIONS TO DIALOGUING CONTROL INTERPRETER.
```
|Copy < 18(2a)m5x > into [ 18(2a)fxt ].                          |
```

NOTES: 18(2a)fxt is a different area if time t is different, providing an
       option to save previous working lists made at an earlier times.

FIGURE 3, STEP G (PART 2):

Figure 3, step G (part 2). User is prompted to add to or edit additional
detail of the elements of important Situations in user's working list.

DInq2  W(user chooses menu item q=G2 (inside MIRR sequence, n=1 say)),
       I(prompt user to add to/edit the elements of important Situations)
       G(updated working list of important Situation elements in 18(2))

DKnq2  INSTRUCTIONS TO DIALOGUING CONTROL INTERPRETER.

```
|Copy < 18(2a)fxt > into editing space [ 18(2a)m5x ],
|  "  < 18(2b)fxt >   "      "      "  [ 18(2b)m5x ],
|  "  < 18(2c)fxt >   "      "      "  [ 18(2c)m5x ],
|  "  < 18(2d)fxt >   "      "      "  [ 18(2d)m5x ].
```

TEMPLATE OF INSTRUCTIONS TO USER 14: (m, n, f and q need not show)

```
|You are at step q = < 18(2a)m2 > of dialogue n = < 18(2a)m1 >.
|
|Elements of current working list of important Situations are:
|< 18(2a)m5x >   < 18(2b)m5x >   < 18(2c)m5x >   < 18(2d)m5x >
|
|Please edit or add to these lists. When you are done editing or
|adding to this list, type "done" or anything here [ 18(2a)m4 ].
|
|If at any time you need help in understanding how to proceed,
|type "help" or anything here [ 18(2a)m3 ]
```

INSTRUCTIONS TO DIALOGUING CONTROL INTERPRETER.

```
|Copy < 18(2a)m5x > into area [ 18(2a)fxt ],
|  "  < 18(2b)m5x >   "    "  [ 18(2b)fxt ],
|  "  < 18(2c)m5x >   "    "  [ 18(2c)fxt ],
|  "  < 18(2d)m5x >   "    "  [ 18(2d)fxt ].
```

FIGURE 4, STEP H1:

Figure 4, Step H1, where user is prompted to select the most urgent and important Situation from the working list for resolution, to identify the Imperative that make it important, and to review the Knowledge that is associated with planning resolutions of this Imperative.

DInq.  W(user chooses menu item q=H1 (inside MIRR sequence, n=1 say)),
       I(prompt user to select the most urgent and important Situation,
            then to identify the Imperative making it important, and to
            think about the Knowledge associated with planning a resolution)
       G(user focussed on the Situation now needing resolution, and on
            the Imperatives and associated Knowledge needed to resolve it)

DKnq2  TEMPLATE OF INSTRUCTIONS TO USER 14: (m, n, f and q need not show)

```
|You are at step q = < 18(2a)m2 > of dialogue n = < 18(2a)m1 >.
|
|Your current working list of names of important Situations is:
|< 18(2a)fxt >
|
|Please select the name of your most urgent and important
|Situation and enter it here [ 18(2a)m6 ].
|
|Your current list of Imperatives is:
|< 18(1)fgt >
|
|Please identify the Imperative that gives the most importance
|to this Situation you have named < 18(2a)m6 > and,
|then record this Imperative's reference name here [ 18(2a)m7 ].
|
|Think about this Imperative in terms of the Knowledge you have
|access to that will allow you to investigate how you might be
|able to resolve this Situation. When you are ready to proceed,
|type "ready" or anything in here [ 18(2a)m4 ].
|
|If at any time you need help in understanding how to proceed,
|type "help" or anything here [ 18(2a)m3 ]
```

NOTES: 18(2a)m6 is a working store location referencing a Situation,
       18(2a)m7 is a working store location referencing an Imperative.

The template might also invite the user to return to earlier steps if necessary to edit or add to the current lists of Imperatives and/or Situations.

END OF CURRENT ILLUSTRATIONS OF DIALOGUING IMPERATIVES & TEMPLATES

APPENDIX D

ILLUSTRATING THE RELATIONSHIPS BETWEEN KINDS OF MENTAL OBJECTS.

The logical relationship between a user's Imperative elements, important Situations, kinds of Knowledge and Executive Agents are shown. Situations include those which give rise to mental activity to recognize Situations, those which follow through the deliberation process and which describe, then implement the execution of resolution plans using Executive Agents, and those which describe: experiential learning from the execution, the problems of Knowledge access, of the need for role/goal renegotiation and of the need for evolving one's Self (in the World) Image.

Note that the MIRR algebra is used for formalizing the thinking by and the communications among expert dialogue sequence designers.

```
Imperatives structure:      [W(Rhw)     I(Ahiw)    G(PjRhijw)    E(Vhijkw)]g
                               |
Object (State) Knowledge:   Ko[Rhw]
                               |
Important feeling Situations: |
   Directly experienced:       PVRwx
   Confirmed Rhw instance:     PVRhwx
```

NOTES: The user realizes that there are important feeling Situations that demand mental attention aimed at recognizing implications of importances. User is taught to realize that Imperatives make Situations important and that the user's own Imperatives can be identified and the parts examined. User is further taught that user's Object (State) Knowledge allows this user to examine the relationship between the important feeling Situation and the components of the Imperative that make this Situation important. User is also taught that awareness of Situations include the Probability that they are exist, plus their Importance relative to other Situations. Probability is estimated using Object Knowledge. Imperatives give Values. The Rwx is a particular instance or example of the more general kind of State Rhw, a characteristic of the triggering State of the Imperative.

The user is guided through this process in steps H1 and H2 of Figure 4, where it is anticipated that the user might not at first be able to recognize the x to h connection. Some users may still believe in certain delusionary connections and need help in recognizing their mental objects and interconnecting them; using step H9, leading to step F in Figure 3.

```
Evaluation Knowledge:                                              Ke[fghijkw]
                                                                      |
Imperatives 1 structure:    [W(Rhw)     I(Ahiw)    G(PjRhijw)    E(Vhijkw)]1
Imperatives 2 structure:    [W(Rhw)     I(Ahiw)    G(PjRhijw)    E(Vhijkw)]2
Imperatives 3 structure:    [W(Rhw)     I(Ahiw)    G(PjRhijw)    E(Vhijkw)]3
       -                       |                                      |
Imperatives g structure:    [W(Rhw)     I(Ahiw)    G(PjRhijw)    E(Vhijkw)]g
                               |
Object (State) Knowledge:   Ko[Rhw]
                               |
Important feeling Situations: |
   Directly experienced:       PVRwx
   Confirmed Rhw instance:     PVRhwx
```

NOTES: If more than one Imperative seems to be giving importance to this Situation, then the user can invoke her/his Evaluation Knowledge and so prioritize the different Imperatives, thus being able to pay attention to only the most highly valued Imperative first in the deliberation process. This is done in step H3 of the deliberation process described in Figure 4 where step H6 is used later in the process to consider other Imperatives. Many Imperatives have their Value (importance) given by other more basic Imperatives, and in fact Imperatives arrange themselves in hierarchies (Hierarchy of Values) which can be examined. To live, eat, like sugar,..

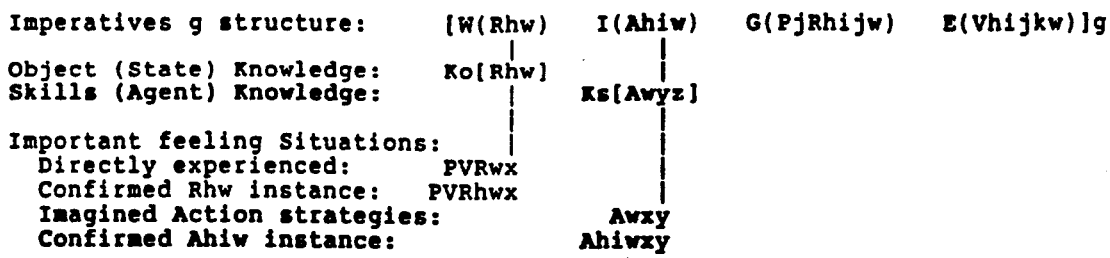

```
Imperatives g structure:      [W(Rhw)    I(Ahiw)    G(PjRhijw)   E(Vhijkw)]g
                                 |
Object (State) Knowledge:     Ko[Rhw]
Skills (Agent) Knowledge:                Ks[Awyz]

Important feeling Situations:
   Directly experienced:      PVRwx
   Confirmed Rhw instance:    PVRhwx
   Imagined Action strategies:            Awxy
   Confirmed Ahiw instance:               Ahiwxy
```

NOTES: User is taught to explore Imperatives and to develop an awareness of the component parts. These include the general kind of Action strategy that the Imperative calls for. Some users will have Imperatives that are not very fully formed, a vague wish for some future state with no ideas about how to get there, a desire to get out of a current state with no idea of how. These kinds of Situations are still very important but before they can be acted on deliberatively by a person experiencing them, some help H9 is required from others who are able to help them articulate the Imperative more fully and to develop effective strategies. Example: teaching a crying baby to indicate to its mother what exactly is wrong.

Step H4 is where the user explores the triggered Action strategy Ahiw in the context of the particular important Situation Rwx, (or Rhwx, once its relationship to the Imperative's triggering State is established). These responsive Action strategies Awxy (or Ahiwxy when confirmed as instances) may include sequences of actions that have to be scheduled for execution by a series or network of interacting Executive Agents. Step H7 revisits the actual planning and scheduling of a finally selected Action strategy into the agendas of the available Executive Agents. At step H4 the user only needs to consider the <u>strategies</u> in general, provided she/he is able to assess feasability prior to actually designing the Action <u>plans</u>.

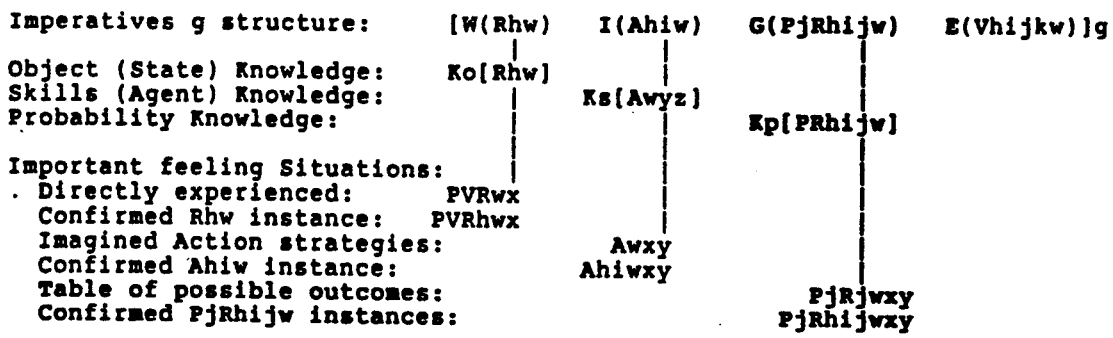

```
Imperatives g structure:      [W(Rhw)    I(Ahiw)    G(PjRhijw)   E(Vhijkw)]g
                                 |
Object (State) Knowledge:     Ko[Rhw]
Skills (Agent) Knowledge:                Ks[Awyz]
Probability Knowledge:                              Kp[PRhijw]

Important feeling Situations:
 . Directly experienced:      PVRwx
   Confirmed Rhw instance:    PVRhwx
   Imagined Action strategies:            Awxy
   Confirmed Ahiw instance:               Ahiwxy
   Table of possible outcomes:                      PjRjwxy
   Confirmed PjRhijw instances:                     PjRhijwxy
```

NOTES: Users are taught to deal with complex probabilistic interventional situations using the Probability Knowledge associated with Imperatives that call for this kind of deliberation. Many users will need help with this kind of complexity and will benefit from expert supplied Knowledge. There will be cases where it will be necessary to recognize the kinds of contingent conditions that indicate which Probability distributions Pj, to expect in the set of possibilities Rhijw, and thus in the Rhijkwxy. To recognize whether these conditions pertain, the user will also need to use Object Knowledge about these conditions. This Object Knowledge is also associated with Imperatives that apply to such role/goal agreements.

There will be other cases where the contingent conditions for favourable Probabilities need to be created. In such cases, the user will need to make plans for acting in the Situation to produce these conditions. This amounts to a more extensive interventional Action strategy and plan.

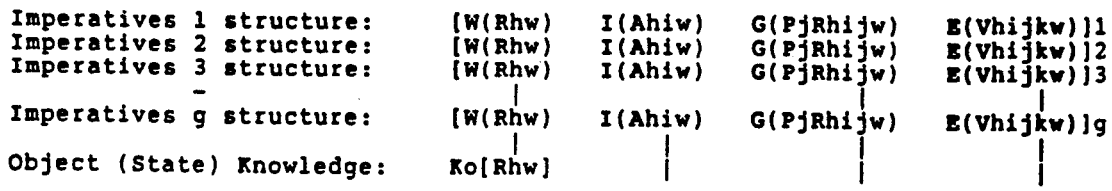

```
Imperatives 1 structure:      [W(Rhw)    I(Ahiw)    G(PjRhijw)   E(Vhijkw)]1
Imperatives 2 structure:      [W(Rhw)    I(Ahiw)    G(PjRhijw)   E(Vhijkw)]2
Imperatives 3 structure:      [W(Rhw)    I(Ahiw)    G(PjRhijw)   E(Vhijkw)]3
          -
Imperatives g structure:      [W(Rhw)    I(Ahiw)    G(PjRhijw)   E(Vhijkw)]g Object (State) Knowledge:     Ko[Rhw]
```

```
Skills (Agent) Knowledge:              Ks[Awyz]
Probability Knowledge:                            Kp[PRhijw]
Evaluation Knowledge:                                         Ke[fghijkw]

Important feeling Situations:
  Directly experienced:       PVRwx
  Confirmed Rhw instance:     PVRhwx
  Imagined Action strategies:           Awxy
  Confirmed Ahiw instance:              Ahiwxy
  Table of possible outcomes:                     PjRjwxy
  Confirmed PjRhijw instances:                    PjRhijwxy
  Set of Probable Values & Possible Costs:                    PjVhijkwxy
```

NOTES: The user is taught to consider what other Imperatives might be triggered by the likely unfolding events if any of the Action strategies under consideration were to actually be chosen. These Imperatives need to be positioned for priority relative to the primary Imperative that was chosen at step H3 as the basis of the deliberations to date. Deliberation may have to cycle back if other Imperatives need to be considered as well before finally choosing the Action strategy.

A recommended basis for making the final choice is to maximize PROBABLE VALUE while containing the POSSIBLE LOSS within a threshold of pain (or destruction) of the user's choosing. If uncertainties are considerable, it might not be possible to make a decision. This condition amounts to a failure of user accessable Knowledge, a condition calling for going to step F to register and subsequently resolve the Knowledge access deficit.

If the available means for gaining access to the necessary Knowledge are inadequate, the user arrives at step D, to register the fact that time is up and the role/goals agreed to in step C cannot be satisfied. They, and the associated Imperatives now need to be renegotiated; step C again.

If the thought of having to renegotiate these agreements has the effect of generating serious emotional distress, the user is prompted to go to step B. At this step the user is taught to interpret this distress as a direct indication that the self-in-the-world image of the user is in need of evolutionary changes. This work amounts to another deliberation, the process requiring Knowledge about evolving one's self-in-the-World image. This whole concept is based on MIRR model theory and a continuing subject for research. Again the MIRR Knowledge model processor is a useful tool.

This evaluation process in the presence of probabilities should normally lead, for the sufficiently knowledgable user (usually a group of users), to a prioritization and thus a choice of the preferred Action strategy.

```
Imperatives g structure:       [W(Rhw)    I(Ahiw)    G(PjRhijw)    E(Vhijkw)]g Object (State) Knowledge:      Ko[Rhw]
Skills (Agent) Knowledge:                 Ks[Awyz]
Probability Knowledge:                               Kp[PRhijw]
Evaluation Knowledge:                                             Ke[fghijkw]

Important feeling Situations:
  Directly experienced:        PVRwx
  Confirmed Rhw instance:      PVRhwx
  Imagined Action strategies:              Awxy
  Confirmed Ahiw instance:                 Ahiwxy
  Table of possible outcomes:                        PjRjwxy
  Confirmed PjRhijw instances:                       PjRhijwxy
  Set of Probable Values & Possible Costs:                         PjVhijkwxy
  Actual implementation plan:  Afghijkwxyz
  and set of probable results:                       PjRfghijkwxyz
```

NOTES: User is taught to use Skills Knowledge about the needed available Executive Agents to plan the details of the implementation, including the messages to be sent to these Executive Agents to get them to accomplish their parts in the actual implementation of the whole Action strategy.

This part is step H7 in the deliberation process detail Figure 4. It allows the recording of the user Awareness of the future Situation where these Agents are executing the action strategy, shown as Afghijkwxyz.

Next the user is prompted to go to step H8. Here the prompts guide the user to make a final check of the Action plan and confirm it. This step might lead the user to recycling through some parts of the deliberation. When satisfied, the user is prompted to set expectations about what might happen as a result of initiating the Action strategy as planned, and to estimate the Probabilities for the different possible outcomes. This is shown as PjRfghijkwxyz. Note that the expectations include not only what the material or Physical outcomes are, but also the Psychological ones.

This Knowledge based estimate is used later in step L, where the user is prompted to make comparisons with what actually happens, in order to learn experientially from the pragmatic experience of actual reality.

Step H9 is the end of the deliberation detail, where, if successful, the user is prompted to step I to actuall begin the Activity. If unsuccessful in completing the deliberations, as described above, the user is prompted to go to step F to begin a search for access to the the needed Knowledge, or if unsuccessful at doing this in time to satisfy the agreed to role and goal Imperatives, to renegotiate them, and possibly, to evolve user self images.

END

What is claimed is:

1. A method, to be carried out by a computer system, for accomplishing a dialogue with a user of the system, including the steps of:

provinding a first message to the user, said first message containing a dialogue query concerning a User Imperative, said first message containing a menu of Dialoguing Imperatives;

receiving a first response from the user, said first response selected by the user from said menu of Dialoguing Imperatives;

selecting a template from Dialoguing Knowledge in consequence to said first response from the user;

retrieving entries from a User Awarenesses database;

prompting the user and receiving responses from the user according to said template and entries from said User Awarenesses database so as to determine component elements of said User Imperative, the component elements of said User Imperative including (a) a type of triggering State;

(b) a type of Action strategy;

(c) a set of Probable types of consequential results from implementing the type of Action strategy on the type of triggering State; and (d) a Value of said User Imperative relative to other recorded Imperatives of the user.

2. A method as set forth in claim 1 and further including the step of recording the component elements of said User Imperative within said database of User Awarenesses.

3. A method as set forth in claim 2 and further including a step of ordering said User Imperative and said recorded Imperatives of the user in order of said Value.

4. A method as set forth in claim 1 and further including the steps of:

providing a second message to the user, said second message containing a dialogue query concerning a User Situation of significance to the user;

receiving the second response from the user; and prompting the user and receiving responses from the user according to said template and entries from a User Situations area in said User Awarenesses database so as to determine the component elements of the user's description of said User Situation, the component elements of said User Situation including (a) a name for referencing the User Situation;

(b) a locality in space and time where the Object or State giving rise to the User Situation did, does, or will exist;

(c) a Value of the User Situation to the user; and (d) a Probability estimate of the truth of the existence of an Object or State having the value at the space and time locality.

5. A method as set forth in claim 4 and further including a step of storing the component elements determined from the second response within the database of User Awarenesses.

6. A method as set forth in claim 5 and further comprising the step of ordering the stored records of User Situations by significance to the user.

7. A method as set forth in claim 4 and further including the steps of:

providing a third message to the user, said third message containing a dialogue query concerning User Knowledge;

receiving a third response from the user; and prompting the user and receiving responses from the user according to said template so as to determine categories of the User Knowledge, the categories of the User Knowledge including (a) Evaluation Knowledge;

(b) Object Knowledge;

(c) Skills Knowledge; and (d) Probability Knowledge.

8. A method as set forth in claim 7 wherein

Evaluation Knowledge describes Values Hierarchies that prioritize the user's Imperatives, and where these prioritizing functions may include numbers, algebraic expressions, algorithms, or references to experts whose opinions are accepted by the user;

Object Knowledge describes how the user recognizes an Object or State by making a set of specified scan and sense actions to obtain a corresponding characteristic set of response messages when an instance of this kind of Object or State exists at the space and time locality where the scanning and sensing is executed;

Skills Knowledge describes the programming of Physical Executive Agents, in terms of an activating Signal, an Activity executed in response to the activating Signal, and a Message that is returned when the Activity is completed; and Probability Knowledge includes a set of Probability weighted entries of possible outcomes from described Actions that are made as interventions into described initial States, and wherein these Probabilities are described as functions of contingent conditions that pertain in the space and time locality where an interventional Activity is to occur.

9. A method as set forth in claim 8 wherein for Skills Knowledge the Activities and the completion Messages are described as Probability weighted tables.

10. A method as set forth in claim 7 and further including the step of recording the User Knowledge within the database of User Awarenesses.

11. A method as set forth in claim 10 and further comprising the steps of accessing the recorded User Knowledge and employing the recorded User Knowledge as content in communications, between different users, or the same user.

12. A method as set forth in claim 11 and further including a step of motivating, guiding, informing and educating a user through the communication of recorded User Knowledge that is included within templates containing associated structured messages to a user.

13. A method as set forth in claim 7, and further including the steps of:
providing a fourth message to the user, said fourth message containing a dialogue query concerning Executive Agents that the user believes are available to the user;
receiving said fourth response from the user; and
prompting the user and receiving responses from the user according to said template and entries from an Executive Agents area in said User Awarenesses database so as to determine a description of the capabilities of the Executive Agent, including
(a) a reference name for the Executive Agent;
(b) a Signal that initiates the Activity of the Executive Agent;
(c) an Activity performed by the Executive Agent; and
(d) a Message that the Executive Agent returns when the Activity is accomplished.

14. A method as set forth in claim 13 and further including the step of recording the determined description of the Executive Agent within the database of User Awarenesses.

15. A method as set forth in claim 13 and further including the steps of eliciting, recording and accessing user responses in sequences following predetermined sequences of thought, based on recorded database information of User Imperatives, User Situations, User Knowledge, and Executive Agents.

16. A method as set forth in claim 15 and further including an initial step of structuring the predetermined sequences of thought based on said recorded database information having the components of User Imperatives, User Knowledge, User Situations and Executive Agents and Action strategies, said Action strategies having implementation plans employing Agents to execute segments of Activity, said Action strategies including a messaging Action that signal Agents when, where, and how to execute planned Action strategies.

17. A knowledge processing system comprising:
Dialogue Control means for providing a first message to a user, that first message containing a dialogue query concerning a User Imperative, the Dialogue control means receiving a first response from the user;
the Dialogue control means including means for prompting the user and receiving responses from the user according to the first response so as to determine component elements of a User Imperative, the component elements of the User Imperative including
(a) a triggering State component;
(b) an Action strategy component;
(c) a set of Probable types of consequential results from the implementation the Action strategy component on the triggering State component; and
(d) a Value of the User Imperative relative to other Imperatives of the User.

18. A system as set forth in claim 17 and further comprising first memory means coupled to the Dialogue Control means for recording User Awarenesses, and wherein the component elements of the User Imperative are stored within the first memory means.

19. A system as set forth in claim 18 wherein the first memory means also stored information elicited from the user recording one or more User Situations, User Knowledge, and Executive Agents known to the user.

20. A system as set forth in claim 19 wherein the User Knowledge is stored as Evaluation Knowledge, Object Knowledge, Skills Knowledge, and Probability Knowledge.

21. A system as set forth in claim 17 and further comprising second memory means coupled to the Dialogue Control means for recording a plurality of Dialoguing Imperatives, including preprogrammed Dialoguing Imperatives and a user-selected Dialoguing Imperative.

22. A system as set forth in claim 21 and further comprising third memory means coupled to the Dialogue Control means for recording Dialoguing Knowledge templates, the third memory means being responsive to the user-selected Dialoguing Imperative for presenting templates to the user through the Dialogue Control means in a sequence that is specified by the user-selected Dialoguing Imperative.

23. A system as set forth in claim 19 wherein the one or more User Situations are each stored within component elements including: a description employed by the user for referencing a particular User Situation, a description of a space-time locality of the situational Sate, a level of significance of the User Situation, and Probability of the existence of the User Situation.

24. A system as set forth in claim 19 further comprising: Executive Agents known to the user are each stored with component elements including: a reference to or name of the Executive Agent, a description of a triggering Signal that invokes the Executive Agent's activity, a description of an Activity that is produced by the Executive Agent when invoked, and a description of a Message produced by the Executive Agent when the Activity is completed.

25. A system as set forth in claim 19 wherein the Dialogue Control means operates in accordance with the user-selected Dialoguing Imperative to elicit, record and access user responses following predetermined sequences of thought, based on the recorded User Awarenesses database of User Imperatives, User Situations, User Knowledge, and Executive Agents.

26. Apparatus for carrying out a dialogue with a user of a computer system comprising:
means for providing a first message to the user, said first message containing a menu of Dialoguing Imperatives;
means for receiving a first response from the user, said first response selected by the user from said menu of Dialoguing Imperatives;

means for selecting a template from a Dialoguing Knowledge area of a User Awarenesses database, said template selected according to said first response from the user, said template describing a User Imperative, a User Situation, User Knowledge, and an Executive Agent;

means for retrieving entries from said User Awarenesses database;

means for prompting the user and receiving responses from the user according to said template and entries from said User Awarenesses database so as to determine component elements of said User Imperative;

means for providing a second message to the user, said second message containing a dialogue query concerning a User Situation;

means for receiving a second response from the user, said second response prompted by the dialogue query concerning said User Situation;

means for prompting the user and receiving responses from the user according to said template and entries from a User Situations area in said User Awarenesses database so as to determine the component elements of said User Situation;

means for providing a third message to the user, said third message containing a dialogue query containing User Knowledge;

means for receiving a third response from the user, said third response prompted by the dialogue query concerning said User Knowledge;

means for prompting the user and receiving responses from the user according to said template so as to determine categories of the User Knowledge;

means for providing a fourth message to the user, said fourth message containing a dialogue query concerning Executive Agents;

means for prompting the user and receiving responses from the user according to said template so as to determine a description of the capabilities of said Executive Agent.

* * * * *